US008868621B2

(12) United States Patent
D'Onofrio, II et al.

(10) Patent No.: US 8,868,621 B2
(45) Date of Patent: Oct. 21, 2014

(54) DATA EXTRACTION FROM HTML DOCUMENTS INTO TABLES FOR USER COMPARISON

(75) Inventors: Ray J. D'Onofrio, II, Buffalo Grove, IL (US); Ray J. D'Onofrio, Edgewater, FL (US)

(73) Assignee: Rillip, Inc., Edgewater, FL (US)

(*) Notice: Subject to any disclaimer, the term of this patent is extended or adjusted under 35 U.S.C. 154(b) by 0 days.

(21) Appl. No.: 13/278,143

(22) Filed: Oct. 20, 2011

(65) Prior Publication Data

US 2012/0102015 A1 Apr. 26, 2012

Related U.S. Application Data

(60) Provisional application No. 61/455,463, filed on Oct. 21, 2010.

(51) Int. Cl.
*G06F 17/30* (2006.01)

(52) U.S. Cl.
CPC .... *G06F 17/30864* (2013.01); *G06F 17/30569* (2013.01)
USPC .......................................................... 707/811

(58) Field of Classification Search
CPC ................................................ G06F 17/30569
USPC ................................................ 707/756, 811
See application file for complete search history.

(56) References Cited

U.S. PATENT DOCUMENTS 6,247,018 B1 6/2001 Rheaume
6,334,132 B1 12/2001 Weeks
6,718,515 B1 * 4/2004 Conner et al. ................ 715/207
6,920,609 B1 7/2005 Manber
7,590,647 B2 9/2009 Srinivasan
7,680,855 B2 * 3/2010 Hyder et al. .................. 707/710
2003/0229854 A1 12/2003 Lemay
2004/0111400 A1 6/2004 Chevalier
2004/0158799 A1 8/2004 Breuel
2005/0273706 A1 12/2005 Manber
2006/0095274 A1 * 5/2006 Phillips et al. .................... 705/1
2006/0224604 A1 * 10/2006 Landsman et al. ............ 707/100
2007/0198481 A1 8/2007 Hogue
2007/0240032 A1 10/2007 Wilson
2008/0098300 A1 * 4/2008 Corrales et al. ............... 715/243
2008/0208817 A1 * 8/2008 Allsop et al. ...................... 707/3
2008/0222140 A1 * 9/2008 Lagad et al. ...................... 707/5

(Continued)

FOREIGN PATENT DOCUMENTS

EP 2096561 A1 9/2009

OTHER PUBLICATIONS

Suhit Gupta et al., "Automating Content Extraction of HTML Documents", 2005, Springer, WWW: Internet and Web Information Systems, No. 8, pp. 179-224.*

(Continued)

*Primary Examiner* — Rehana Perveen
*Assistant Examiner* — Scott A Waldron

(57) ABSTRACT

The Computer-implemented system, method or computer program that creates a data table of rows and columns from an HTML Web page or document independent of the HTML markup tags. Data embedded in the HTML is identified using clustering of text and extracted into a data table. The generation of data tables can be performed in real-time and is not subject to problems with malformed or poorly created HTML.

1 Claim, 18 Drawing Sheets

(56) References Cited

U.S. PATENT DOCUMENTS

| | | | | |
|---|---|---|---|---|
| 2008/0294679 | A1 | 11/2008 | Gatterbauer | |
| 2009/0259619 | A1* | 10/2009 | Hsieh | 707/2 |
| 2010/0083095 | A1* | 4/2010 | Nikovski et al. | 715/234 |
| 2010/0145902 | A1* | 6/2010 | Boyan et al. | 706/54 |
| 2010/0153682 | A1 | 6/2010 | Jahankhani | |

OTHER PUBLICATIONS

Gold, Language Identification in the Limit, Information and Control, 10, 447-474, 1967.

Chia-Hui Chang, IEPAD: Information Extraction Based on Pattern Discovery, ACM, May 1-5 2001, WWW10 '01, Hong Kong.

Crescenzi, Road Runner: Towards Automatic Data Extraction from Large Web Sites, Proceedings of the 27th VLDB Conference, 2001, Roma Italy.

Wood, Lauren, The Web: The W3C DOM Specification, Jan.-Feb. 1999, IEEE Internet Computing, USA, 1089-7801/99/.

Jindal, Wrapper Generation . . . , 4th International Workshop DNIS 2005, Japan, Subhash Bhalla, Mar. 2005.

Jindal, A Generalized Tree Matching Algorithm Considering Nested Lists for Web Data Extraction, SIAM International Conference on Data Mining, pp. 930-941 (2010).

* cited by examiner

```
<div id="body-top"></div>
  <div id="body" class="lg-gutter">
    <div id="content" class="browse-page rankings-page ">
  <h1> SUV Rankings: Affordable Compact SUVs
  <p class="comment"> Ranking of compact SUVs and crossovers, generally priced
under $25,000. Honda CR-V, Toyota RAV4, Ford Escape and more. Rankings based on
an in-depth <a href="/methodology/"> analysis</a>by U.S. News editors of all
published auto ratings, reviews and test drives.
  <div id="results">
    <ul id="rankings-nav">
      <li class="selected"><div>Ranking List</div></li>
      <li><a href="/cars-trucks/rankings/Affordable-Compact-SUVs/grid/overall/">
Sort by Scores</a></li>
    </ul>
    <div class="car-listing">
      <div class="left">
        <a href="/cars-trucks/Chevrolet_Equinox/"><img
src="http://static.usnews.rankingsandreviews.com/images/Auto/chrome/324171/324171
_140x70.jpg" width="140" height="70" alt="Chevrolet Equinox Image" border="0"/>
        <ul class="stats"></a>
          <li> MSRP: $22,745 - $30,070 </li>
          <li> Invoice: $21,608 - $28,567 </li>
          <li> Avg. Paid: <a href="/cars-trucks/Chevrolet_Equinox/prices/">
$23,053 - $30,317</a></li>
          <li> MPG: 22 2010 City / 32 2010 Hwy </li>
        </ul>
      </div>
      <div class="center">
        <h3>
          <div class="ranks">
            <span class="rank"><span>#</span>1</span>
          </div>
        <a href="/cars-trucks/Chevrolet_Equinox/"> 2011 Chevrolet Equinox
        </h3>
        <!—TODO: we need to limit this to 3 lines of text of it will mess up
formatting-->
        <p class="short-desc">
            The Chevrolet Equinox is a competent crossover that manages to offer
fuel economy that rivals many mid-size sedans, the size of many mid-size SUVs
        </p>
        <ul class="links">
          <li class="first"><a href="/cars-trucks/Chevrolet_Equinox/"> Read full
review</a></li>
          <li><a href="/cars-trucks/dealer-quote/?pid=11478"> Get dealer
quote</a></li>
        </ul>
      </div>
      <div class="right">
        <table class="score-card">
          <tr><th colspan="2"> U.S.News Scores</th></tr>
          <tr class="overall"></td><td> Overall<td class="score">8.9</td></tr>
          <tr><td> Performance:</td><td class="score">7.9</td></tr>
          <tr><td> Exterior:</td><td class="score"> 8.9</td></tr>
          <tr><td> Interior:</td><td class="score"> 9.3</td></tr>
          <tr><td> Safety:</td><td class="score"> NA</td></tr>
          <tr><td> Reliability:</td><td class="score"> NA</td></tr>
        </table>
```

FIG. 5 (a)

```
      </div>
      <div class="clearleft"></div>
    </div>
    <div class="car-listing">
      <div class="left">
        <a href="/cars-trucks/GMC_Terrain/"><img
src="http://static.usnews.rankingsandreviews.com/images/Auto/chrome/326568/326568
_140x70.jpg" width="140" height="70" alt="GMC Terrain Image" border="0"/>
        <ul class="stats"></a>
          <li> MSRP: $24,250 - $31,400 </li>
          <li> Invoice: $23,038 - $29,830 </li>
          <li> Avg. Paid: <a href="/cars-trucks/GMC_Terrain/prices/"> $24,591 -
$31,704</a></li>
          <li> MPG: 22 City / 32 Hwy </li>
        </ul>
      </div>
      <div class="center">
        <h3>
          <div class="ranks">
            <span class="rank"><span>#</span>1</span>
          </div>
        <a href="/cars-trucks/GMC_Terrain/"> 2011 GMC Terrain
        </h3>
        <!—TODO: we need to limit this to 3 lines of text of it will mess up
formatting-->
        <p class="short-desc">
          The GMC Terrain gives compaty SUV buyers refinement, high-tech standard
features and great fuel economy, but all the standards means the Terrain
        </p>
        <ul class="links">
          <li class="first"><a href="/cars-trucks/GMC_Terrain/"> Read full
review</a></li>
          <li><a href="/cars-trucks/dealer-quote/?pid=11481"> Get dealer
quote</a></li>
        </ul>
      </div>
      <div class="right">
        <table class="score-card">
          <tr><th colspan="2"> U.S.News Scores</th></tr>
          <tr class="overall"></td><td> Overall<td class="score">8.9</td></tr>
          <tr><td> Performance:</td><td class="score">8.1</td></tr>
          <tr><td> Exterior:</td><td class="score">7.4</td></tr>
          <tr><td> Interior:</td><td class="score">9.1</td></tr>
          <tr><td> Safety:</td><td class="score"> NA</td></tr>
          <tr><td> Reliability:</td><td class="score"> NA</td></tr>
        </table>
      </div>
      <div class="clearleft"></div>
    </div>
```

FIGURE 5(b)

```
"http://usnews.rankingsandreviews.com/cars-trucks/rankings/Affordable-Compact-
SUVs/
(1) <html xmlns="http://www.w3.org/1999/xhtml" xml:lang="en" lang="en">
(2) <head>
(25) <body>
  ├(26) <div id="header">
  ├(183) <ul id="breadcrumbs">
  ├(195) <div id="body-top">
  ├(197) <div id="body" class="lg-gutter">
  │   ├(198) <div id="content" class="browse-page rankings-page ">
  │   │   ├(199) <h1> [SUV Rankings: Affordable Compact SUVs]
  │   │   ├(201) <p class="comment"> [Ranking of compact SUVs and crossovers,
generally priced under $25,000. Honda CR-V, Toyota RAV4, Ford Escape and more.
Rankings based on an in-depth ]
  │   │   │   └(202) <a href="/methodology/"> [analysis  by U.S. News editors of all
published auto ratings, reviews and test drives.]
  │   │   ├(205) <div id="results">
  │   │   │   ├(206) <ul id="rankings-nav">
  │   │   │   │   ├(207) <li class="selected">
  │   │   │   │   │   └(208) <div> [Ranking List]
  │   │   │   │   └(211) <li>
  │   │   │   │       └(212) <a href="/cars-trucks/rankings/Affordable-Compact-
SUVs/grid/overall/"> [Sort by Scores]
  │   │   │   ├(216) <div class="car-listing">
  │   │   │   │   ├(217) <div class="left">
  │   │   │   │   │   ├(218) <a href="/cars-trucks/Chevrolet_Equinox/">
  │   │   │   │   │   │   └(219) <img
src="http://static.usnews.rankingsandreviews.com/images/Auto/chrome/324171/324171
_140x70.jpg" width="140" height="70" alt="Chevrolet Equinox Image" border="0"/>
  │   │   │   │   │   └(221) <ul class="stats">
  │   │   │   │   │       ├(222) <li> [MSRP: $22,745 - $30,070 ]
  │   │   │   │   │       ├(224) <li> [Invoice: $21,608 - $28,567 ]
  │   │   │   │   │       ├(226) <li> [Avg. Paid: ]
  │   │   │   │   │       │   └(227) <a href="/cars-trucks/Chevrolet_Equinox/prices/">
[$23,053 - $30,317]
  │   │   │   │   │       └(230) <li> [MPG: 22 2010 City / 32 2010 Hwy ]
  │   │   │   │   ├(234) <div class="center">
  │   │   │   │   │   ├(235) <h3>
  │   │   │   │   │   │   ├(236) <div class="ranks">
  │   │   │   │   │   │   │   └(237) <span class="rank">
  │   │   │   │   │   │   │       └(238) <span> [# 1]
  │   │   │   │   │   │   └(242) <a href="/cars-trucks/Chevrolet_Equinox/"> [2011
Chevrolet Equinox]
  │   │   │   │   │   ├(245) <Comment>
  │   │   │   │   │   ├(246) <p class="short-desc"> [The Chevrolet Equinox is a
competent crossover that manages to offer fuel economy that rivals many mid-size
sedans, the size of many mid-size SUVs
  │   │   │   │   │   └(248) <div class="links">
  │   │   │   │   │       ├(249) <li class="first">
  │   │   │   │   │       │   └(250) <a href="/cars-trucks/Chevrolet_Equinox/"> [Read
full review]
  │   │   │   │   │       ├(253) <li>
  │   │   │   │   │       │   └(254) <a href="/cars-trucks/dealer-quote/?pid=11478">
[Get dealer quote]
  │   │   │   │   ├(259) <div class="right">
  │   │   │   │   │   └(260) <table class="score-card">
  │   │   │   │   │       ├(261) <tr>
```

FIG. 6(a)

```
| | | | |      | └(262) <th colspan="2"> [U.S.News Scores]
| | | | |      ├(265) <tr class="overall">
| | | | |      | ├(266) <td> [Overall:]
| | | | |      | └(268) <td class="score"> [8.9]
| | | | |      ├(271) <tr>
| | | | |      | ├(272) <td> [Performance:]
| | | | |      | └(274) <td class="score"> [7.9]
| | | | |      ├(277) <tr>
| | | | |      | ├(278) <td> [Exterior:]
| | | | |      | └(280) <td class="score"> [8.9]
| | | | |      ├(283) <tr>
| | | | |      | ├(284) <td> [Interior:]
| | | | |      | └(286) <td class="score"> [9.3]
| | | | |      ├(289) <tr>
| | | | |      | ├(290) <td> [Safety:]
| | | | |      | └(292) <td class="score"> [NA]
| | | | |      └(295) <tr>
| | | | |        ├(296) <td> [Reliability:]
| | | | |        └(295) <td class="score"> [NA]
| | | | └(303) <div class="clearleft">
| | | ├(306) <div class="car-listing">
| | | | ├(307) <div class="left">
| | | | | ├(308) <a href="/cars-trucks/GMC_Terrain/">
| | | | | | └(309) <img
src="http://static.usnews.rankingsandreviews.com/images/Auto/chrome/326568/326568
_140x70.jpg" width="140" height="70" alt="GMC Terrain Image" border="0"/>
| | | | | └(311) <ul class="stats">
| | | | |   ├(312) <li> [MSRP: $22,250 - $31,400 ]
| | | | |   ├(315) <li> [Invoice: $23,038 - $29,830 ]
| | | | |   ├(316) <li> [Avg. Paid: ]
| | | | |   | └(317) <a href="/cars-trucks/GMC_Terrain/prices/">
[$24,591 - $31,704]
| | | | |   └(320) <li> [MPG: 22 City / 32 Hwy ]
| | | | ├(324) <div class="center">
| | | | | ├(325) <h3>
| | | | | | ├(326) <div class="ranks">
| | | | | | └(332) <a href="/cars-trucks/GMC_Terrain/"> [2011 GMC
Terrain]
| | | | | ├(335) <Comment>
| | | | | ├(336) <p class="short-desc"> [The GMC Terrain gives compaty SUV
buyers refinement, high-tech standard features and great fuel economy, but all
the standards means the Terrain
| | | | | └(338) <div class="links">
| | | | |   ├(339) <li class="first">
| | | | |   | └(330) <a href="/cars-trucks/GMC_Terrain/"> [Read full
review]
| | | | |   └(343) <li>
| | | | |     └(344) <a href="/cars-trucks/dealer-quote/?pid=11481">
[Get dealer quote]
| | | | ├(349) <div class="right">
| | | | | └(350) <table class="score-card">
| | | | |   ├(351) <tr>
| | | | |   | └(352) <th colspan="2"> [U.S.News Scores]
| | | | |   ├(355) <tr class="overall">
| | | | |   | ├(356) <td> [Overall:]
| | | | |   | └(358) <td class="score"> [8.9]
| | | | |   ├(361) <tr>
```

FIG. 6(b)

```
│  │  │  │  │     │  ├(362) <td> [Performance:]
│  │  │  │  │     │  └(364) <td class="score"> [8.1]
│  │  │  │  │     ├(367) <tr>
│  │  │  │  │     │  ├(368) <td> [Exterior:]
│  │  │  │  │     │  └(370) <td class="score"> [7.4]
│  │  │  │  │     ├(373) <tr>
│  │  │  │  │     │  ├(374) <td> [Interior:]
│  │  │  │  │     │  └(276) <td class="score"> [9.1]
│  │  │  │  │     ├(379) <tr>
│  │  │  │  │     │  ├(380) <td> [Safety:]
│  │  │  │  │     │  └(382) <td class="score"> [NA]
│  │  │  │  │     └(385) <tr>
│  │  │  │  │        ├(396) <td> [Reliability:]
│  │  │  │  │        └(388) <td class="score"> [NA]
│  │  │  │  └(393) <div class="clearleft">
│  │  │  ├(396) <div class="car-listing">
│  │  │  ├(486) <div class="car-listing">
│  │  │  ├(576) <div class="car-listing">
│  │  │  ├(666) <div class="car-listing">
│  │  │  ├(756) <div class="car-listing">
│  │  │  ├(846) <div class="car-listing">
│  │  │  ├(936) <div class="car-listing">
│  │  │  ├(1026) <div class="car-listing">
│  │  │  ├(1116) <div class="car-listing">
│  │  │  ├(1206) <div class="car-listing">
│  │  │  ├(1296) <div class="car-listing">
│  │  │  ├(1386) <div class="car-listing">
│  │  │  ├(1476) <div class="car-listing">
│  │  │  ├(1566) <div class="car-listing">
│  │  │  ├(1656) <div class="car-listing">
│  │  │  ├(1746) <div class="car-listing">
│  │  │  ├(1836) <div class="car-listing">
│  │  │  ├(1926) <div class="car-listing">
│  │  │  ├(2016) <div class="car-listing">
│  │  │  ├(2106) <div class="car-listing">
│  │  │  ├(2196) <div class="car-listing">
│  │  │  └(2286) <div class="car-listing last">
│  │  └(2377) <div id="not-ranked">
│  ├(2412) <div id="sidebar">
│  ├(2565) <div style="clear:both;">
│  └(2567) <div id="foot-content">
├(2570) <div id="footer">
├(2602) <Script>
├(2603) <Script>
├(2604) <Comment>
├(2605) <Script>
├(2606) <Comment>
├(2607) <Script>
├(2608) <Comment>
└(2609) <Script>
```

FIG. 6(c)

| | | | | | | | | | | | | | |
|---|---|---|---|---|---|---|---|---|---|---|---|---|---|
| 27,985 | 25,744 | Paid: | 27,354 | 28 Hwy | 04 | | production to... | review | quote: | | Scores | | |
| MSRP: 23,200 - 33,500 | Invoice: 21,455 - 31,180 | Avg. Paid: | 21,963 - 31,467 | MPG: 19 City / 26 Hwy | # 05 | 2010 Volkswagen Tiguan | A blend of the words tiger and iguana, the interior... | Read full review | Get dealer quote: | 5 | U.S.News Scores | Overall: 8.5 | Pe |
| MSRP: 20,840 - 29,255 | Invoice: 19,859 - 27,575 | Avg. Paid: | 20,333 - 28,247 | MPG: 21 City / 27 Hwy | # 06 | 2010 Mitsubishi Outlander | The Outlander is a better-than-average performer... | Read full review | Get dealer quote: | 6 | U.S.News Scores | Overall: 8.4 | Pe |
| MSRP: 29,860 - 34,120 | Invoice: 27,738 - 31,615 | Avg. Paid: | 29,537 - 33,738 | MPG: 34 City / 31 Hwy | # 07 | 2010 Ford Escape Hybrid | With a maximum 32 mpg combined fuel economy... | Read full review | Get dealer quote: | 7 | U.S.News Scores | Overall: 8.3 | Pe |
| MSRP: 18,295 - 24,790 | Invoice: 17,930 - 23,280 | Avg. Paid: | 18,805 - 25,370 | MPG: 21 City / 29 Hwy | # 07 | 2011 Kia Sportage | The 2011 Kia Sportage is all-new, and while revised... | Read full review | Get dealer quote: | 8 | U.S.News Scores | Overall: 8.3 | Pe |
| MSRP: 24,750 - 30,700 | Invoice: 21,566 - 28,785 | Avg. Paid: | 22,171 - 29,681 | MPG: 16 City / 20 Hwy | # 07 | 2010 Nissan Xterra | The Nissan Xterra is an affordable off-roader with... | Read full review | Get dealer quote: | 9 | U.S.News Scores | Overall: 8.3 | Pe |
| MSRP: 20,295 - 28,495 | Invoice: 19,214 - 26,707 | Avg. Paid: | 19,909 - 27,663 | MPG: 21 City / 27 Hwy | # 07 | 2010 Subaru Forester | The 2010 Subaru Forester, redesigned last year... | Read full review | Get dealer quote: | 10 | U.S.News Scores | Overall: 8.3 | Pe |
| MSRP: 20,525 - 25,585 | Invoice: 19,110 - 23,803 | Avg. Paid: | 19,110 - 23,803 | MPG: 20 City / 25 Hwy | # 11 | 2010 Honda Element | If you prefer utility and look-at-me style over comfort... | Read full review | Get dealer quote: | 11 | U.S.News Scores | Overall: 8.1 | Pe |
| MSRP: 21,700 - 33,030 | Invoice: 20,665 - 30,901 | Avg. Paid: | 20,612 - 31,108 | MPG: 20 City / 28 Hwy | # 11 | 2010 Mazda CX-7 | For 2010, Mazdas performance minded SUV gets... | Read full review | Get dealer quote: | 12 | U.S.News Scores | Overall: 8.1 | Pe |
| MSRP: 18,995 - 25,845 | Invoice: 18,296 - 24,544 | Avg. Paid: | 19,206 - 25,979 | MPG: 22 City / 30 Hwy | # 13 | 2010 Hyundai Tucson | While it previously lagged behind competitors... | Read full review | Get dealer quote: | 13 | U.S.News Scores | Overall: 8 | Pe |
| MSRP: 23,560 - 27,380 | Invoice: 22,030 - 25,505 | Avg. Paid: | 22,785 - 26,425 | MPG: 21 City / 28 Hwy | # 14 | 2010 Mercury Mariner | The 2010 Mercury Mariner stands out for its attention... | Read full review | Get dealer quote: | 14 | U.S.News Scores | Overall: 7.9 | Pe |
| MSRP: 30,105 - 31,850 | Invoice: 27,985 – 29,578 | Avg. Paid: | 28,878 - 30,605 | MPG: 34 City / 31 Hwy | # 14 | 2010 Mercury Mariner Hybrid | The Mercury Mariner Hybrids claim to fame is its... | Read full review | Get dealer quote: | 15 | U.S.News Scores | Overall: 7.9 | Pe |
| MSRP: 21,810 - 25,680 | Invoice: 19,839 - 24,376 | Avg. Paid: | 20,563 - 25,237 | MPG: 22 City / 27 Hwy | # 16 | 2011 Nissan Rogue | None | Read full review | Get dealer quote: | 16 | U.S.News Scores | Overall: 7.8 | Pe |
| MSRP: NA | Invoice: NA | Avg. Paid: | 18,936 - 26,994 | MPG: 22 City / 28 Hwy | # 17 | 2010 Mazda Tribute | The Mazda Tribute continues to be an excellent... | Read full review | Get dealer quote: | 17 | U.S.News Scores | Overall: 7.7 | Pe |
| MSRP: 19,099 - 27,199 | Invoice: 18,335 - 26,111 | Avg. Paid: | 19,206 - 27,058 | MPG: 19 City / 26 Hwy | # 18 | 2010 Suzuki Grand Vitara | The Suzuki Grand Vitara stands out for its low price... | Read full review | Get dealer quote: | 18 | U.S.News Scores | Overall: 7.6 | Pe |
| MSRP: 21,060 - 34,120 | Invoice: 19,960 - 31, 639 | Avg. Paid: | 21,103 - 33,795 | MPG: 22 City / 28 Hwy | # 19 | 2011 Ford Escape | The 2011 Ford Escape is available in a number of... | Read full review | Get dealer quote: | 19 | U.S.News Scores | Overall: 7.5 | Pe |
| MSRP: 21,165 - 32,050 | Invoice: 20,614 - 30,186 | Avg. Paid: | 21,026 - 31,335 | MPG: 15 City / 19 Hwy | # 20 | 2010 Jeep Wrangler | The Jeep Wrangler is loved for its rugged off-road... | Read full review | Get dealer quote: | 20 | U.S.News Scores | Overall: 7.2 | Pe |

FIG. 7

DATA EXTRACTION FROM HTML DOCUMENTS INTO TABLES FOR USER COMPARISON

RELATED APPLICATIONS

The present patent document claims the benefit of the filing date under 35 U.S.C. §119(e) of Provisional U.S. Patent Application Ser. No. 61/455,463, filed Oct. 20, 2010, which is hereby incorporated by reference in its entirety.

BACKGROUND

The World Wide Web (or "Web") contains a vast amount of information. Web users rely upon the Web to research various topics and comparing the topic items using similar attributes. One way to find information on a computer network, such as the Web or the Internet, is through the use of a Web search engine.

A user typically begins a search for information by using a computer, handheld device, telephone, or other web enabled device to access a search engine on the Web. The user may speak or type into the device a search term related to the desired topic or information (e.g., "compact car," "Barack Obama," "Capital of Texas"). In response to the search term, the Web search engine may return to the device browser a list of web sites containing the search term. The user then reviews the websites one by one by clicking each link to examine the content of each Web result returned.

Due to Web search engine imprecision, results returned by a search engine may be related to the desired topic or information, or may be completely unrelated. The task of reviewing the returned Web content is time consuming and arduous. As Web content increases, it is increasingly more desirable to have innovative techniques and systems for efficiently comparing and reviewing Web search results.

BRIEF SUMMARY

By way of introduction only, in accordance with one variation of the invention, computer implemented methods and systems for performing a comparison, for example but not limited to, a comparison of people, places or things, by combining data from a group of, for example, Hyper Text Markup Language (HTML) documents. HTML documents may be returned from, for example, a Web search engine when prompted by a search term, which may be a common comparison topic. The HTML pages may have content associated to the search term, which may be a common comparison topic.

The computer implemented methods and systems may include, but are not limited to, a computer program that runs on a computer, a computer network, or otherwise, to extract data relevant to the search topic, which may be a common comparison topic, from each HTML page into, for example but not limited to one or more tables. The computer-implemented program, which may run on a computer, a computer network, or otherwise, may, for example, perform at least one of merging, cleansing and/or formatting the data from, for example, a table or a set of tables, into single table. The computer-implemented program, may additionally or alternatively, present at least one table to, for example, the browser of a computer, handheld device, cell phone, or other electronic device, and may allow a user to manipulate the data—for example, to add, change, or delete data in the table.

A system, method and computer program, running on a computer, computer network, handheld electronic device, cell phone, or otherwise, may create at least one table for each HTML document and may additionally or alternatively analyze the content using an algorithm running on, for example, a computer, computer network, handheld electronic device, cell phone, or otherwise. The algorithm may have at least one of the properties of being resistant to malformed HTML Web pages, not requiring the identification of specific HTML tag types, not utilizing pattern matching or spatial reasoning and/or performing with high fidelity for real-time use.

Additionally or alternatively, there may be a separate computer-implemented algorithm, or integrated algorithm that, when operating on a computer such as but not limited to a desktop computer, computer network, handheld device, or cell phone, performs at least one of merging the tables, identifying common key fields in the one or more tables created from individual HTML documents, using the keys fields to merge the individual tables, and/or removing duplicate rows and columns. The result of the operation of the one or more algorithms, when operating on a computer, may be a single table of merged data presented to the computer user, for example, on the browser of a computer, web enabled handheld device, telephone, cell phone, or otherwise, for the purpose of, for example, comparing information or as collecting related information for input into other methods and systems.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 5(*a*)-(*b*). Is an exemplary illustration of Web HTML page source with information to be extracted to a table.

FIG. 6(*a*)-(*c*). Is an exemplary illustration of Web HTML Tag Tree or Element Tree with information to be extracted to a table.

FIG. 7. Is an exemplary illustration of one exemplary table automatically extracted from the Web HTML page depicted in FIG. 4.

DETAILED DESCRIPTION

Figure 1:
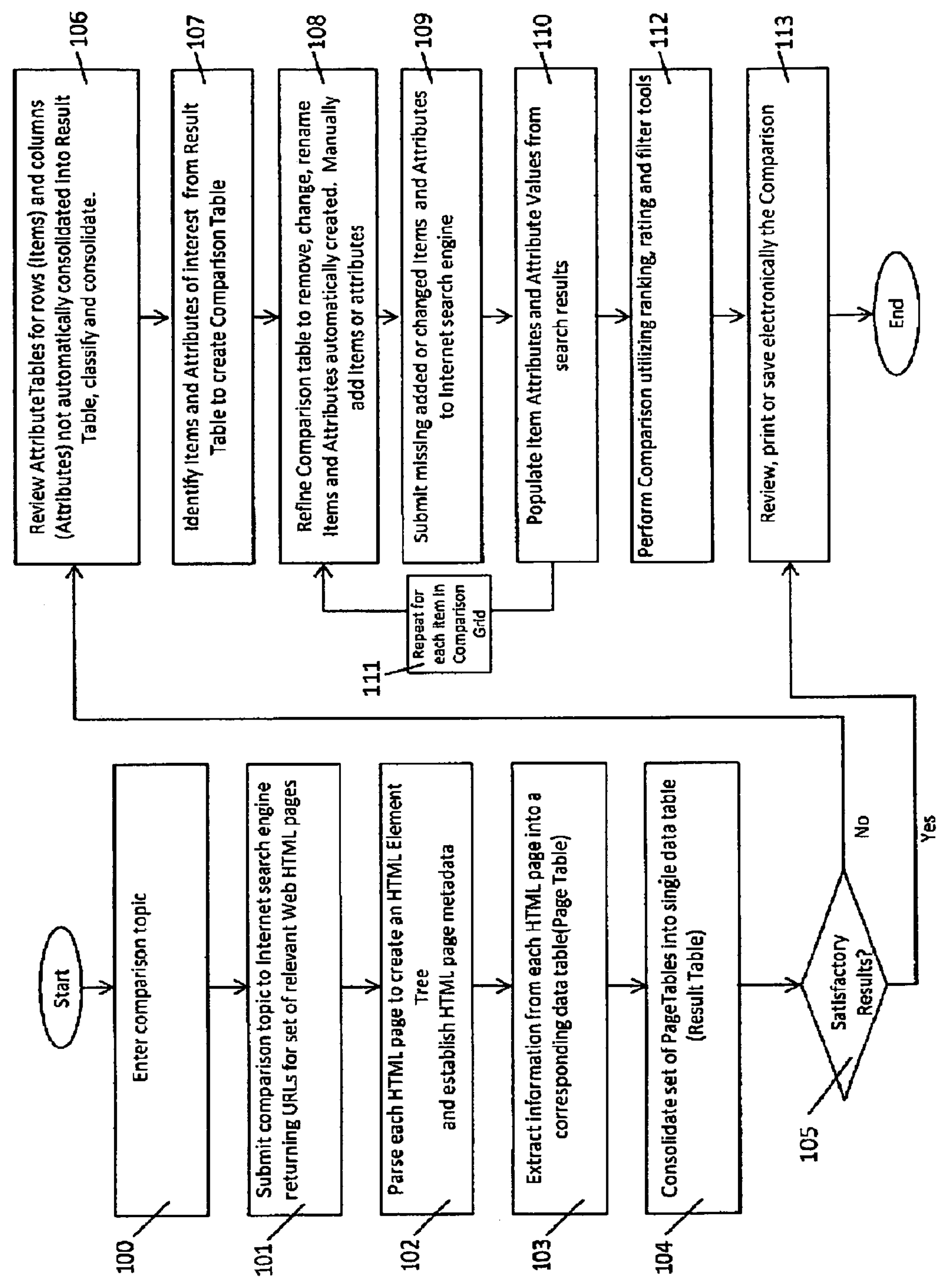
FIG. 1. Is an exemplary high-level logical flow of an automated comparison process.

The Internet supports an immense collection of information resources such as the HTML documents of the World Wide Web (WWW or Web) and attached publications. The most common method to find information is entering a search term into a Web Search Engine (sometimes referred to as Internet Search Engines) such as Google, Bing or Yahoo and manually reviewing the set of HTML pages returned by the search for information relevant to the entered search term.

A common use of the information on the Web is to perform a comparison. This comparison could be people, such as political candidates or celebrities. It could be a comparison of places such a vacation destination, place to live or a place to operate a certain type of business. The most common comparison is of things such as cars, appliances, technology and professional services, which is often done prior to purchasing.

Web search tools are generally effective tools to find information on the Internet. However, sometimes a user must perform repetitive searches for information that may reside in multiple Web sites before they can form a comparison of, for example, people, places and things. For example, a user wishing to use Web search tools to make a comparison of new tires for their car may have to perform multiple searches with different search terms, sifting through the results to identify a relevant page or pages, bookmarking or printing the relevant page or pages for later retrieval and review and then searching again. After the searching, sifting, and saving for retrieval method is completed, the actual comparison is performed outside of the search tool by clicking from page-to-page or manually by sorting through the printed pages.

There are Web sites that provide price comparisons, but these Web sites may rely upon the user to know and understand precisely what the user is looking for. For example, the consumer may be looking for price comparisons on a "compact car." If the consumer uses a price comparison Web site, such as Google, they will receive 52,000 results, which relate to everything from (toy) compact car kits, compact car themed jewelry, compact car auto parts (e.g. exhaust systems) and etc. To retrieve somewhat useful results, the user must already have some knowledge of the various compact carmakers, the exact make and model of the various compact cars, and must enter the make and model of each car one by one, each in a separate search. Even at this level of detail, the price comparison Web search engines return significant irrelevant information.

There are also Web sites that support comparisons through the use of proprietary databases. These exist in at least two categories, for example, one category of specialized sites focus on comparing a particular product or service with examples being cars.com (cars), winespectator.com (wine) and cruises.com (cruises). A second category are sites that allow the comparison of a single category or broad range of products or services with examples being cnet.com (technology), consumerreports.org (consumer products and services) and findthebest.com (broad range). The type of Web sites mentioned above have the common limitation that a comparison is restricted to items and attributes that are stored in the site's proprietary database. An additional limitation of using a database is the data used for the comparison is only accurate at the point in time entered or updated which in even very short periods can result in omissions or inaccuracies of items and/or attributes.

The alternative and innovative approach disclosed herein allows a user to perform a comparison programmatically, for example, accessing in real-time, the plurality of HTML pages on the Web that contain the collection of information relevant to the comparison. This type of real-time comparison has been unattainable due to the lack of a programmatic system to perform one or more of the discrete steps in the comparison process.

Referring now to the drawings, FIG. 1 is a block diagram of a variation of the system. In the exemplary variation, there are about five steps represented by blocks 100 through 104 to perform a comparison utilizing information from the Web. Each of the five steps represented may be broken into additional steps or may be combined into fewer steps. Steps may be added or removed. These steps may be generally followed regardless of the approach: manual, via a proprietary database or in real-time. An automated comparison may be achieved by, for example but not limited to, providing automated approaches for the steps represented by at least one of blocks 103, 104, and 105.

Again referencing block 103, there is currently no known method for the computer-implemented automated extracting of data from any one or more of unique Web pages into a tabular, grid or matrix format. This may be due to Web pages being constructed from HTML, which produces documents intended to be easily read and understood by humans rather than being machine readable, resulting in HTML generally being considered an unstructured data source and inherently complicated to use as data source. E. M. Gold (E. M. Gold, 1967 and E .M. Gold, 1978) elucidated the challenges of surmising a grammar and defining an algorithm to extract information from sources such as HTML.

In addition to comparisons, utilizing HTML documents as a data source has a broad range of practical uses. As a result, multiple information extraction approaches from HTML exist with each having a set of applications. The methods and systems (typically a computer program) used for information extraction may be called "wrappers" or "extractors." A wrapper may generally contain a template which is a set of metadata that describes how to extract the information, a mechanism to create the template and program to execute the template. In (Chang, Kayed, Girgis and Shaalan, "A Survey of Web Information Extraction Systems," vol. 18 no. 10, IEEE Transactions on Knowledge and Data Engineering, pp. 1411-1428, 2006), incorporated herein in its entirety, describes three dimensions to compare wrappers: Task difficulty in creating the template; Techniques used and; Automation degree.

Information extraction using the HTML structure may utilize specific HTML tags to identify tabular data, for example, <table> tags. In this approach the template metadata may be the HTML tag names.

In one variation, to perform a comparison effectively, information may be extracted from a set of potentially hundreds or thousands of HTML pages which may have the following characteristics: Each page being unique in content, No structural similarities from page to page, High rate of malformed HTML that includes incorrect tag names, no close tags, poor node alignment and uneven tag trees.

In another variation, an effective information extraction approach for the comparison process may include at least one of: Automated information extraction method (e.g., with no human intervention such as training); Ability to work on a single page; Resistant to malformed HTML which include no reliance on specific tag names; High performance with the ability to extract data from hundreds of pages in a few seconds.

We disclose computer-implemented systems, methods and computer programs to consolidate information from one or more HTML pages into, for example, a single table with rows of items and columns of attributes (or vice versa) which can be used to, for example but not limited to, compare people, places or things.

In one variation, there is provided a computer-implemented method to perform a comparison of people, places or things utilizing information extracted from one or more HTML Web pages from, for example, the Internet and consolidate them into, among other configurations, a table format, grid or matrix format, for review or storage. The method of this example may include entering a term describing what is of interest to compare; retrieving a one or a set of HTML pages relevant to that term using the Internet, and more specifically the Web; extracting the relevant information from each HTML page; consolidating the relevant information from each HTML page into, for example, a table format; and one or more of the following: optional selection of items and/or attributes of interest; retrieval of specific items, attributes and/or attribute values to complete the table, rating and ranking the items and/or attributes; review and/or storing of a consolidated table.

According to another variation there is a computer-implemented system and method to create a set of 1 . . . n number HTML pages from the Web, the "Result Set", with each containing information relevant to an entered topic.

According to another variation, there is a computer-implemented system, method and computer program that evaluates all Cell Nodes in the Result Set identifying commonly occurring strings and string groups which may be Result Text. Common words that occur in the language of preference (for English examples: the, a, this, that, etc.) may be excluded from the Result Text. The Result Text may be stored on a computer or network, including the Internet, for use in other aspects of the system, method, or computer program.

According to another variation there may be a computer-implemented system, method and computer program that may retrieve the corresponding Cascading Style Sheets (CSS) from the respective Web site for each HTML page in the Result Text. The CSS files may be parsed and stored on a computer or computer network, for example, the Internet, for use in other aspects of the system, method and computer program.

According to another variation there may be a computer-implemented system and method and computer program that may read each HTML page in the Result Set and may build a hierarchical tree of elements defined by the Document Object Model (DOM) from each HTML page. This aspect may be comprised of, for example but not limited to, an HTML parser that with at least one function that identifies and/or stores a collection of metadata regarding the DOM element tree. The metadata may include, but is not limited to at least one of: element name; element type; element text; Node ID which is numerical number from 1 to the total number of elements; node level with the type node being one (1) and adding one (1) for each level below; binary flag tin indicate the cell is a Table Node (e.g., top node in table); and a binary flag to indicate if the node is a table cell.

According to another variation, there is a computer-implemented system, method and computer program that may, for example, automatically extract the relevant information from each HTML page in the Result Set into a tabular format, which may be a "Page Table." The table format may include rows of items, columns of attributes and cells of attribute values. Unlike known methods, the system, method, and computer program may not require the use of HTML tag names, pattern matching or spatial relations to extract information into a table. The method may utilize the premise that for each HTML page, only elements that contain text in the HTML element tree are eligible leaf node, which may be Cell Nodes, and may contain specific cells values when extracted into a table. The system, method, or computer program may additionally or alternatively operate on the premise that Cell Nodes existing at the same node level in the tree, form one or more record sets (e.g., rows or columns) in a table. Individual tables may be determined by the first common parent node, which may be referred to as the Table Node, for any set of leaf nodes. For each table, each child node of the Table Node may determine a record boundary.

According to another variation there is a computer-implemented system, method and computer program which may at least one of identify and separate incorrectly merged tables from a single HTML page. The method may, for example, evaluate extracted tables for the circumstance where two separate Table Nodes occur at the same node level with the same parent node, which may be incorrectly identified as the single Table Node. The method may further evaluate for distinct groupings of Cell Nodes when a Table node has three or less child nodes, if distinct groupings are found the method may, for example, set the flag for the current Table Node to false as a Table Node and sets the flag for child nodes to be true for Table Nodes.

According to another variation there is a computer-implemented system, method and computer program that may determine the most relevant table to the comparison topic when multiple Tables Nodes are identified for a single HTML table. This variation may utilize the premise that the, for example, most relevant information exists in the middle of the HTML page. This aspect may be comprised of a primary method and two alternate methods to identify the most relevant Table Node of which all, some or none may be executed. The primary method may be to evaluate Table Node's Node ID. If the Node ID is, for example but not limited to, in the first or last ~10% of the total node count for the HTML page, the Table node may be considered less relevant. In a first alternate method may involve comparing the Cell Node text for a specific Table Node to the Result Text, where, for example, the higher the positive association the more relevant the Table Node. In a second alternate method, the method may involve utilizing the CSS position information for the Table to identify the location and determine relevancy.

According to another variation, there may be a computer-implemented system, method and computer program that aligns tables rows that can become misaligned when, among other instances, an inconsistent number of Cell Nodes occur. The presence of misaligned rows may be identified by, for example but not limited to, inconsistencies in the number of Cell Nodes in any specific row in the extracted table. The method may identify the circumstance where an expected Cell Node (e.g., a node at the same Node Level as other Cell Nodes for a single Table Node) is actually a parent node of multiple Cell Nodes. The program may correct this circumstance by, for example, identifying the multiple Cell Nodes as being a single value. This process may occur at the time of extracting the table information or after the table information is extracted.

According to another variation there is a computer-implemented system, method and computer program to automatically consolidate a plurality of tables created from the Result Set into a single table or multiple tables, for example, one or more "Result Tables." A computer-implemented method includes, for example, one or more of iterating though each table derived from the result set, eliminating tables with two or less rows and two or less columns; Candidate Item columns may be identified using the novel and unique premise that the left most column of created tables contains the Item of interest; Candidate Item columns may be validated by a positive association to the collection of values from all left most column of each tabled derived from the Result Set; If the candidate Item column Cell Nodes do not positively associate, moving left to right through the table columns each column may be evaluated for a positive association until a column of Cell Nodes positively associate and the column is moved to the left or first column; Attribute names may be identified through a multi-pass process, with the first pass using the novel and unique premise that the first row Cell Nodes contain Attribute names. Evaluation of the set of first row Cell Nodes for repeating values; for example, Values that repeat in more than a target threshold of the tables may be identified as Attribute names and values of that column Attribute Values; Result Table may be populated with identified Attribute Values from each Page Table, matching the Item, or first column value from the Page Table with the Result Table. Where no match is found, the Attribute Value is not added to the Result Table Columns that are not identified as Attribute Values are evaluated for a repeating text fragments in the cell value (e.g. Inch, sqr/ft, volts, cyl, etc); Repeating text fragments are compared to known Attribute names, if a match exists column may be presumed to be of the same Attribute and cell values moved to appropriate Attribute columns in the Result Table matching Item values to determine row; Where a repeating fragment occurs and no match is made to know attributes a new Attribute column is created in the Result Table with the repeating fragment as the Attribute name. Attribute columns that have been moved from the Page Table to the Result Table may be identified in the metadata as well as visually identified for the computer program user, for example, in a computer browser.

According to another variation there is a computer-implemented system, method and computer program to review the Page Tables and Result Table and provide the computer program user the means to identify, move, remove, change and add either a Page Table or Result Table Items, Attributes and Attribute Values. This variation allows for the manual completion by the computer program user of the Result Table in the event the automated creation is incomplete. It also allows for addition of personalized Items and Attributes that were not present in the HTML pages retrieved from the Web.

According to another variation there is a computer-implemented system, method and computer program to retrieve Item Attributes and Attribute Values, update the Result Table. In the event that the computer program user includes additional Attributes or Items through other aspects of the computer-implemented system, method or computer program, this aspect performs a targeted search of the Web for the specific Item, Attribute or Attribute Value. In this variation is also included a computer-implemented system, method and computer program to parse the retrieved HTML pages for the targeted Item, Attribute or Attribute Value information.

According to another variation there is a computer-implemented system, method and computer program to save or link a Result Table Items, Attributes, Attribute Values and multimedia content (e.g. picture, video, music, etc.) to the original Web content HTML page or pages from which it was derived.

According to another variation there is a computer-implemented system, method and computer program to link a Result Table Items, Attributes and Attribute Values to the original Web content HTML page or pages from which it was derived.

According to another variation there is a computer-implemented system, method and computer program to perform a Comparison of Items in the Result Table. The computer program user is provided and program interface to perform tasks that support the effort to compare items based on entered criteria. Criteria can take the form Attribute weighting, Attribute ratings for Attribute values, filtering Items based on Attribute Values, Attribute ratings and rankings.

According to another variation there is a computer-implemented system, method and computer program to create and/or link to a blog to retain ongoing, interactive commentary regarding any Result Comparison.

According to another variation there is a computer-implemented system, method or computer program to save a Result Comparison that includes at least one of the Result Table, comparison topic, links to original Web pages, multimedia information, computer program user entered information including changes, additions and deletions to the Result Table as well as Comparison results. Additional saved information includes associated blogs or blog links.

According to another variation there is a computer-implemented system, method or computer program to search for and Retrieve a Result Comparison based on criteria.

The computer-implemented system, method or computer program provides a method, system and computer program for performing a comparison of "Items" using information obtained from the World Wide Web (Web) in real time or near real time. Items, for the purpose of the present computer-implemented system, method or computer program are described as any information that a user may decide to look for, for example but not limited to, any person, place or thing. In contrast to the current manual practices, the present computer-implemented system, method or computer program automatically extracts information from a large number of unique HTML pages into a standard table format, providing both a greater depth of information and immense savings in effort.

With reference now to the Figures, and in particular reference to FIG. 1, a conceptual flow diagram, an example of a computer-implemented system, method or computer program, is depicted. The diagram lists the "Steps" in a sequential order for exemplary purposes only. Each step may be divided into more than one step and/or multiple steps may be combined into one. Additionally, or alternatively, steps may be added or deleted and the steps may be performed in a different order than depicted.

Step 100 is the input of a comparison topic into the system. Consistent with common Web search engines the topic can be as broad or discrete as desired by the computer program user. Step 101 is the submission of the comparison topic to Web search engine and the retrieval of a corresponding set of relevant URIs or URLs. In step 102 for each URL in the set an HTML page (or HTML document) is electronically downloaded from the Web. The HTML page is parsed into an HTML Element or Tag Tree. Metadata for the HTML Elements or Tags is collected and stored electronically for use subsequent steps. Step 103 is the automatic extraction of information from each HTML Web pages into a table format with rows of Items and Columns of Attributes, with each table referred to in the present computer-implemented system, method or computer program as a Page Table. This method is unique requiring no human intervention or use of HTML tag names, pattern matching or spatial reasoning making the method highly resistant to commonly malformed HTML. Step 104 is the automatic consolidation of the Page Tables extracted from the Result Set, which is a plurality of HTML Web Pages, into a single Result Table. Step 105 is a decision point to complete the process with the Result Table derived from steps 100 and 104 or perform refinement steps. Step 106 is a manual review of Items and Attributes that could not be consolidated. These are flagged via the metadata in Step 104 during the creation of the Result Table. A computer program interface may be used to assist the user in selecting, identifying and moving items and Attributes to the Result Table. Step 107 is the refinement of the Result Table to only specific Items and Attributes of interest creating the Comparison Table use for the remainder of the comparison steps. In Step 108 item and Attribute changes or deletions are made to the Result Table. This includes manually adding Items and Attributes that may have not been located in the manual process and still of interest to the computer program user. Step 109 utilizes a common Web search engine to retrieve information from the Web specific to added or changed items and Attributes in the Comparison Table. Step 110 new Items and Attributes are extracted from the returned HTML Pages. In this variation of the present computer-implemented system, method or computer program, this step is a compacted process of Steps 100 through 104 creating a Results Table targeting a missing item or attribute. An example would be Comparison Table for the comparison topic of televisions.

A specific model, XYZ-2 is missed and added in Step 108. The Web search is performed on XYZ-2, returning a new secondary Result Table specific to television model XYZ-2. Utilizing the same process described in Step 106, new Items and Attributes are added to the Comparison Table. Step 111 identifies that Steps 108 through 110 are repeated until the Comparison Table contains preferred Items and Attributes. Step 112 is the rating and filter of the Comparison Table Items and Attributes to achieve a final ranking. Step 113 is the review through a computer interface, printing to a device or electronic storage of the Comparison Table or Result Table. When storing, metadata is collected that describes the stored table. The metadata can be used in future comparison efforts to identify stored Comparison Tables or Result Tables that may relevant to the future comparison topic. TABLE 1 is an example of metadata that is stored.

TABLE 1

| Example metadata stored with a Comparison or Result Table |
|---|
| Comparison Topic |
| Date Created |
| User Created By |
| HTML Pages Used |
| URLs Accessed |
| Multimedia Links |

Figure 2:
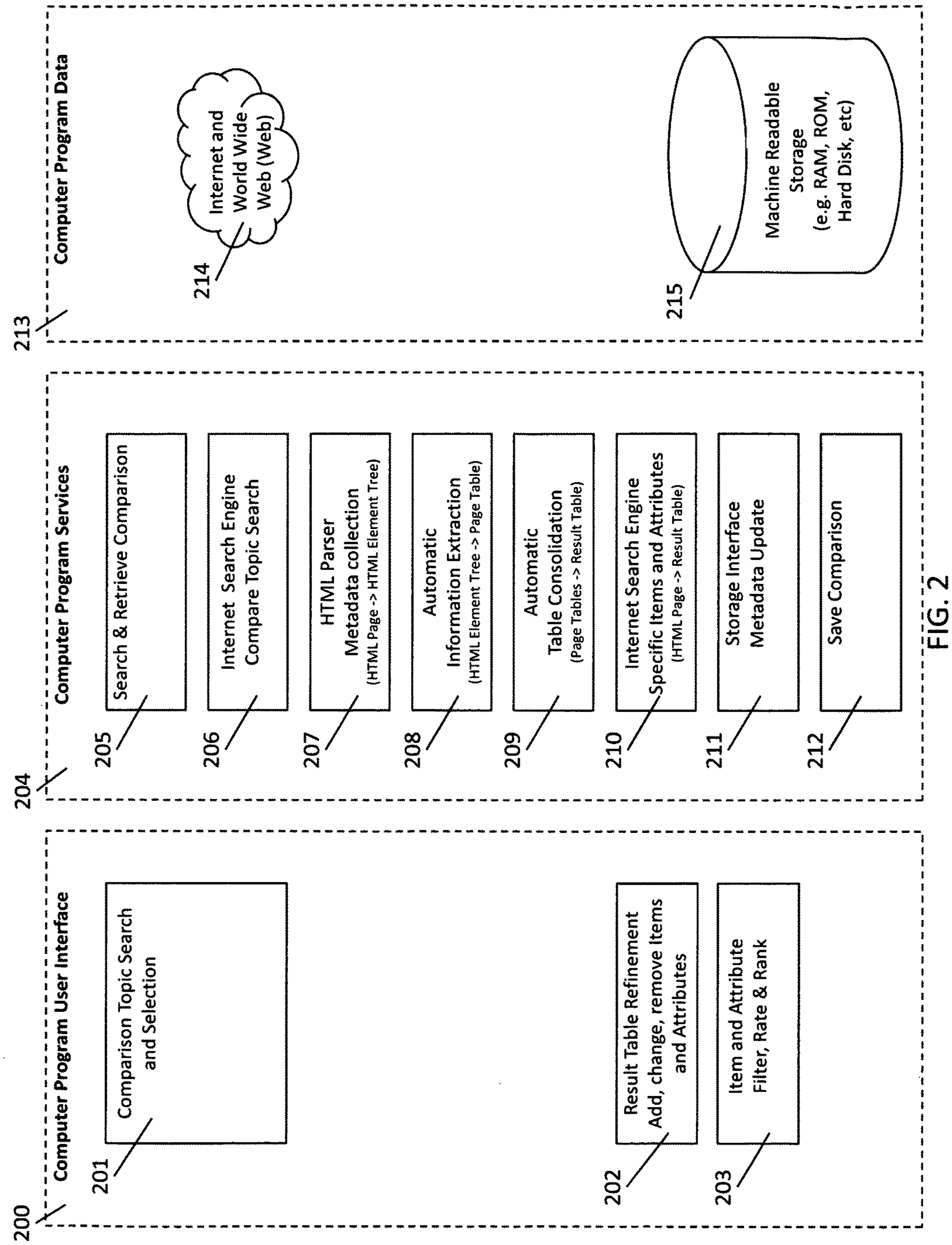
FIG. 2. Is a conceptual diagram of one variation of computer program components which may be used to perform an automated comparison process.

Referencing FIG. 2 is a block diagram which illustrates one example of the conceptual computer program components used to execute the system and method described in FIG. 1 of a computer-implemented system, method or computer program. In FIG. 2, the components are separated into three generalized categories for explanation and are not intended to imply any specific computer program architecture. Furthermore, each block is a conceptual representation of computer program component and is not intended to represent the complete or an only implementation of the computer-implemented system, method or computer program. Block 200 represents computer programs that computer program user would interact with directly. Block 201 is the computer program that accepts a comparison topic, searching the machine-readable storage (Block 215) for existing objects that are relevant to the comparison topic, either Comparison Tables or Result Tables. The computer program user uses the interface to select the existing object or direct the system to utilize the Internet and Web to build a new object utilizing the process described in FIG. 1. Block 202 is the interface to refine a Result Table into a Comparison Table or further refine just a Comparison Table. It provides a means to select an Item or Attribute to either remove it or change the corresponding cell value. It additionally provides a means to add new item row and manually enter an Item value as well as add a new column and manually enter an Attribute (first row in a column) or an Attribute Value for any Item.

This interface uses Block 210 retrieve information from the Web that is specific to an Item or Attribute. Block 203 is the interface to rate or weight specific Attributes as well as filter Items based on Attribute values. This results in a ranked view of the Comparison Table. Block 204 represents the computer programs that perform a non-user function. Block 205 accepts input from Block 201 to find and retrieve existing Comparison or Result Tables. Block 206 initiates a search utilizing a web search engine based on the entered comparison topic. Block 207 is the component inputs an HTML page and outputs an HTML tag tree for the page. This block corresponds to Step 102 in FIG. 1.

Block 208 represents the computer program component that inputs an HTML tag tree and outputs a table, referred to as a Page Table. This block corresponds to Step 103 in FIG. 1. Block 209 represents the computer program component that inputs the Result Set, the set of all Page Tables and outputs a single Result Table that is the consolidation of all Items and Attributes from table in the Result Set. This block corresponds to Step 104 in FIG. 1. Blocks 211 and 212 represent computer program components used to update and store Result Table and Comparison Table objects into the machine-readable storage. The information stored includes, but is not limited to table data, metadata, links and multimedia. Block 212 corresponds to Step 113 in FIG. 1. Block 213 represents the computer program data used by the system. Block 214 represents all information retrieved from the Web. Block 215 is all information used by the system that may be in any machine-readable format that includes databases, in memory storage, in memory tables and any form of persisted storage.

Figure 3:
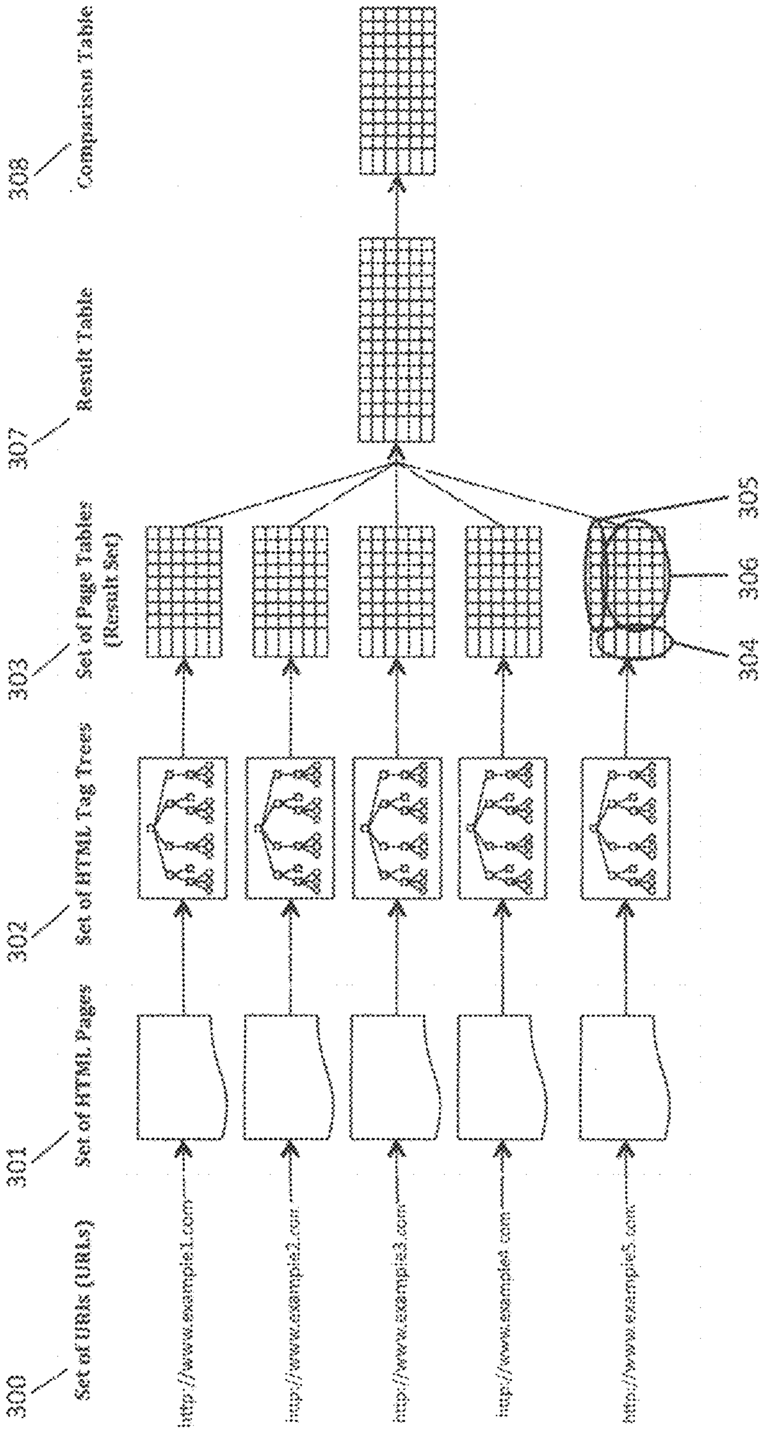
FIG. 3. Is a conceptual diagram of one variation of data format transitions through an exemplary automated comparison process.

Referring now to FIG. 3, a conceptual data flow example of a computer-implemented system, method or computer program is depicted. Block 300 is the list of URIs returned from a Web search engine for the comparison topic entered. With present computer-implemented system, method or computer program there is no preference to the Web search engine used except that the search engine has the ability to accept a topic and return references to HTML pages (or documents) that are relevant to the topic entered. Block 301 represents the HTML pages or documents from the corresponding URLs in Block 300. The present computer-implemented system, method or computer program does not require the initial Web search if a set of HTML pages pertaining to the comparison topic has been identified. Block 302 represents the creation of what is commonly called an HTML tag tree for each HTML Web.

The present computer-implemented system, method or computer program does not require any specific approach to building the tag tree, although requires the ability to associate metadata to each node in the tag tree, where a node is defined as an HTML Element or Tag. TABLE 2 provides an example, while not the only variation of the metadata for each node. Block 303 represents a table created from each HTML tag tree. The present computer-implemented system, method or computer program uses the method described in FIG. 8 which implements the algorithm in TABLE 3 to create a table, referred to as a Page Table, from the HTML tag tree. The table consists of rows of Items and columns of Attributes. Items represent a specific example of what is to be compared based on the comparison topic. An Attribute is a category of information that describes an Item. An Attribute Value is specific value for a specific Attribute for a specific Item and can take any form with examples being a numeric value, a set of descriptions, anecdotal information, a reference or hyperlink, any form of multimedia information or link to multimedia information.

Figure 13:
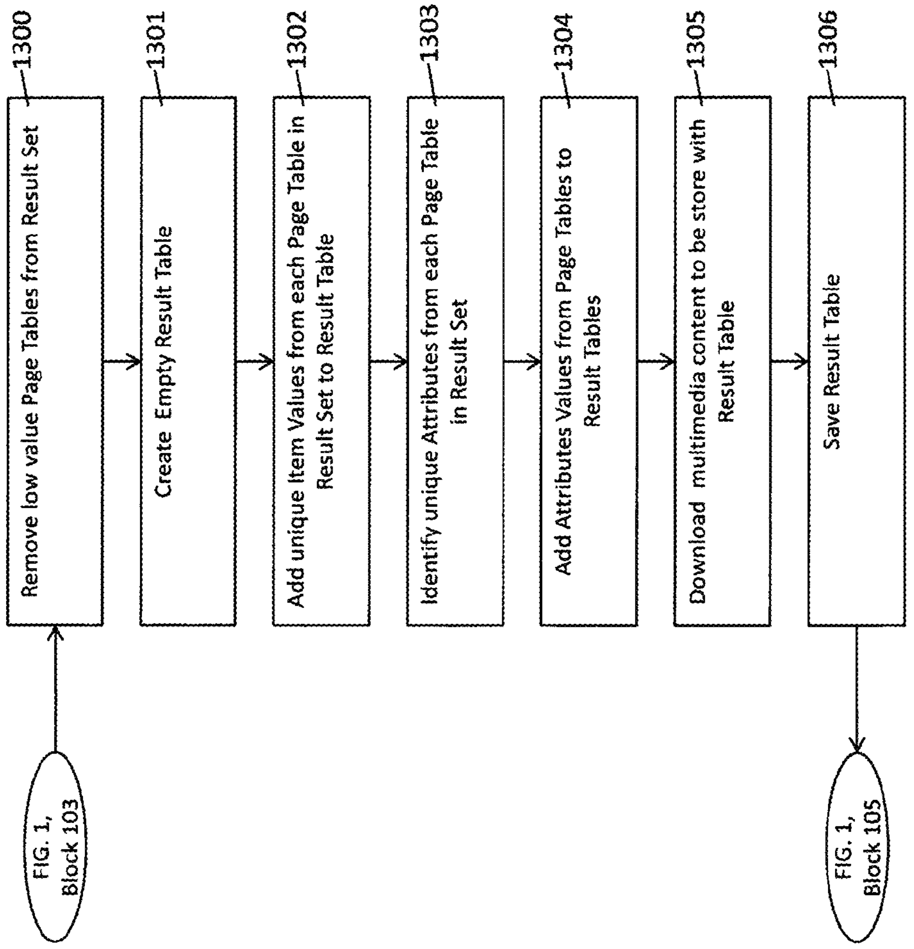
FIG. 13. Is a high-level flow diagram of an exemplary method to consolidate the Page Tables from the Result Set into the Result Table.
Figure 14:
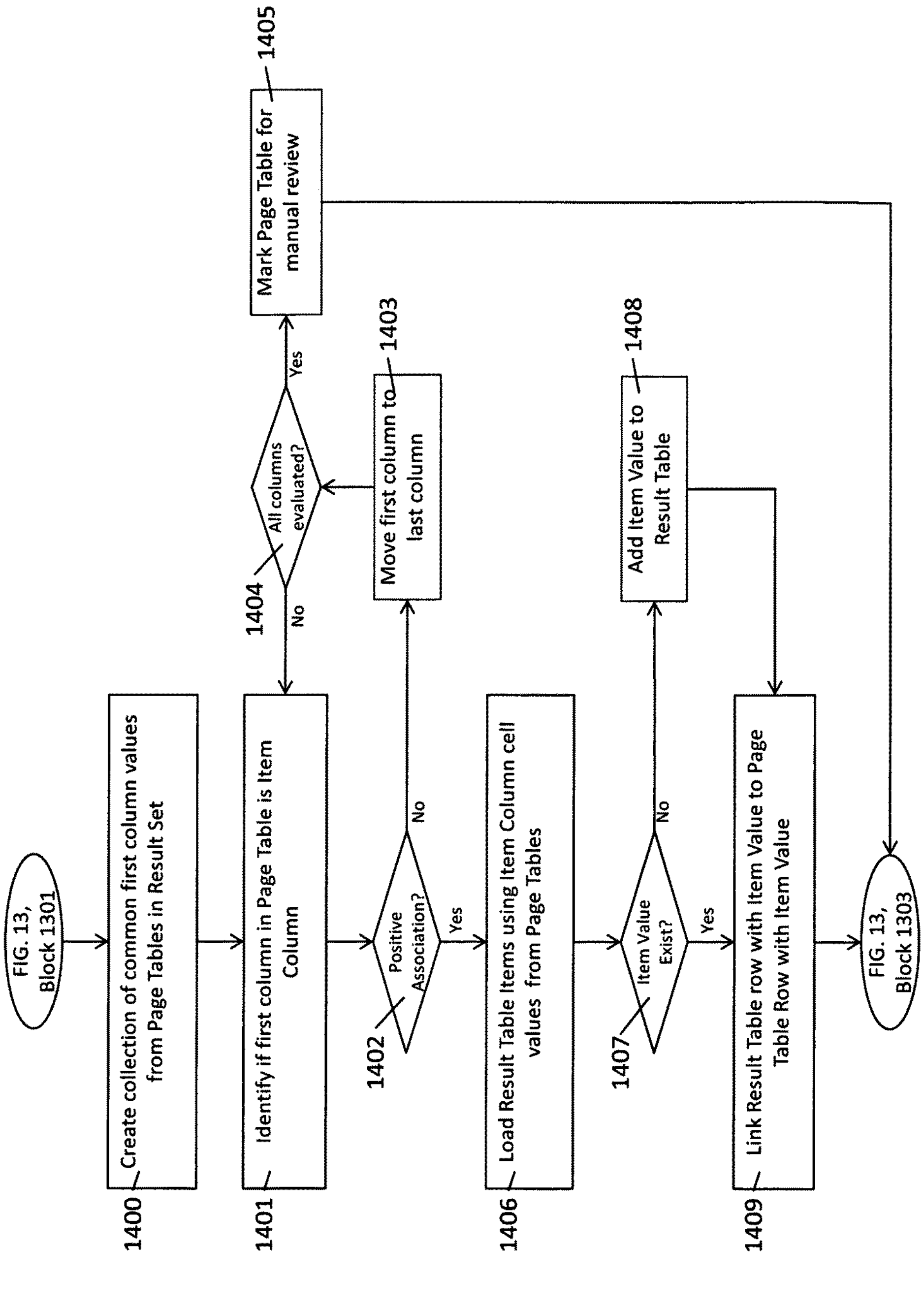
FIG. 14. Is a flow diagram of an exemplary method to identify exemplary items Page Tables and add to exemplary Result Table.
Figure 15:
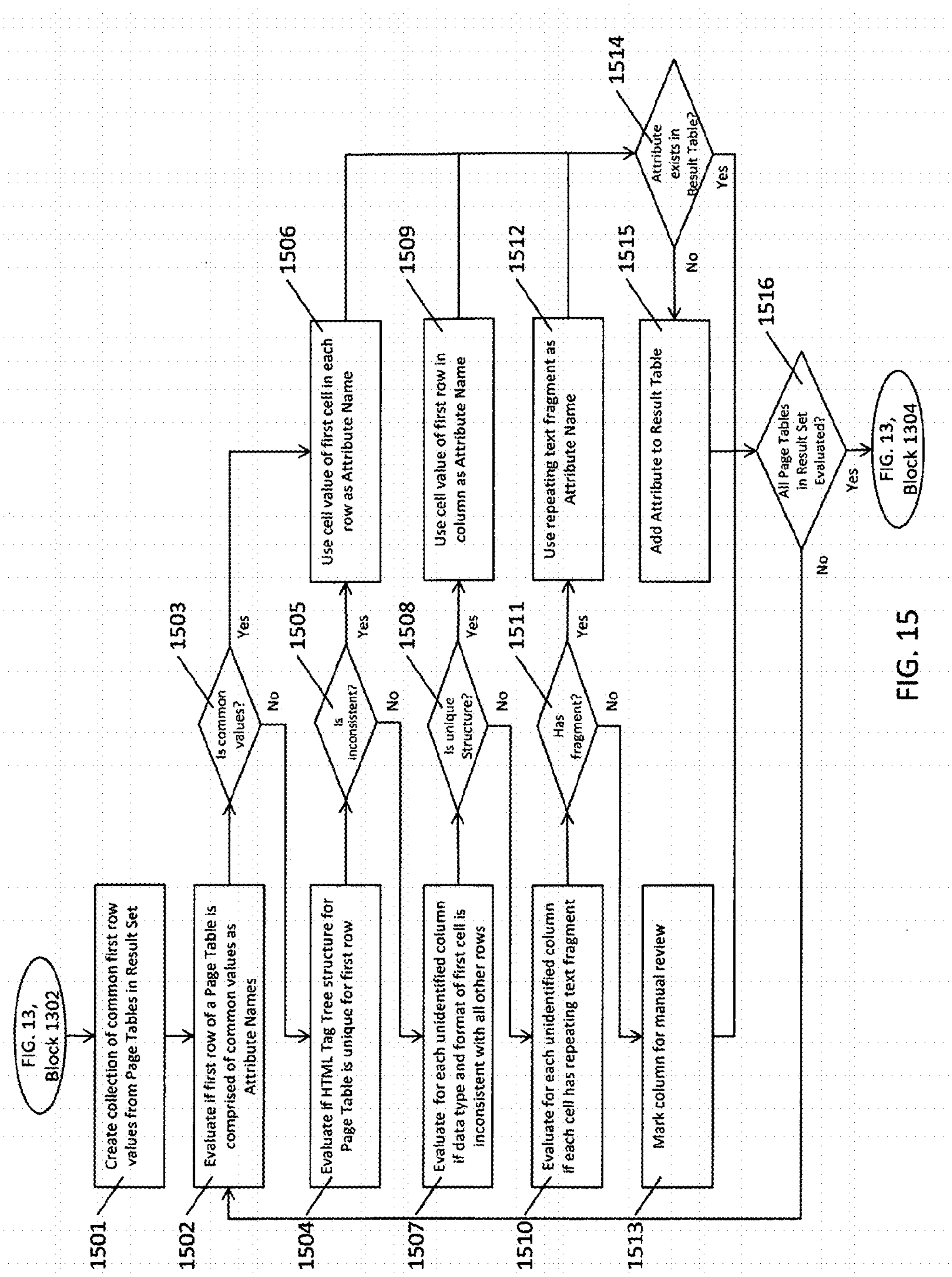
FIG. 15. Is a flow diagram of an exemplary method to identify exemplary Attribute and Attribute Values from Page Tables and add to Result Table.

Block 304 depicts that the Item names or descriptions are in a specific column, with a variation being the left most column. Block 305 depicts that the Attributes are in a specific row, with the most common variation being the top most row. 307 represents the result of consolidating the Page Tables into a single information table, referred to as the Result Table. The present computer-implemented system, method or computer program uses the method described in FIG. 13 which implements the algorithm in TABLE 4. The table is structured like a Page Table using Items, Attributes and Attribute Values. Block 308 represents the output of refining the Result Table as described in FIG. 1, Block 112.

Figure 4:
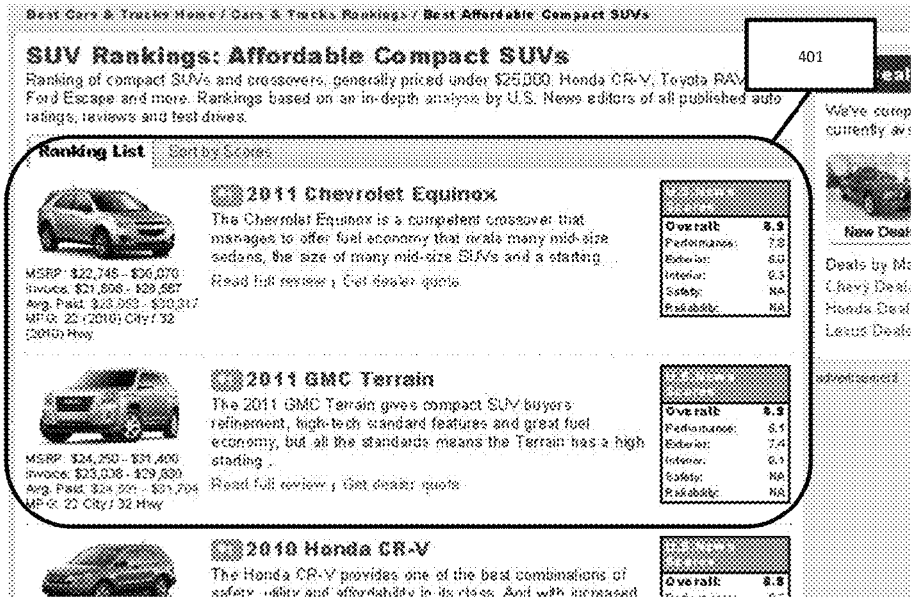
FIG. 4. Is an exemplary illustration of a Web HTML page as viewed with information to be extracted to a table.
Figure 7:
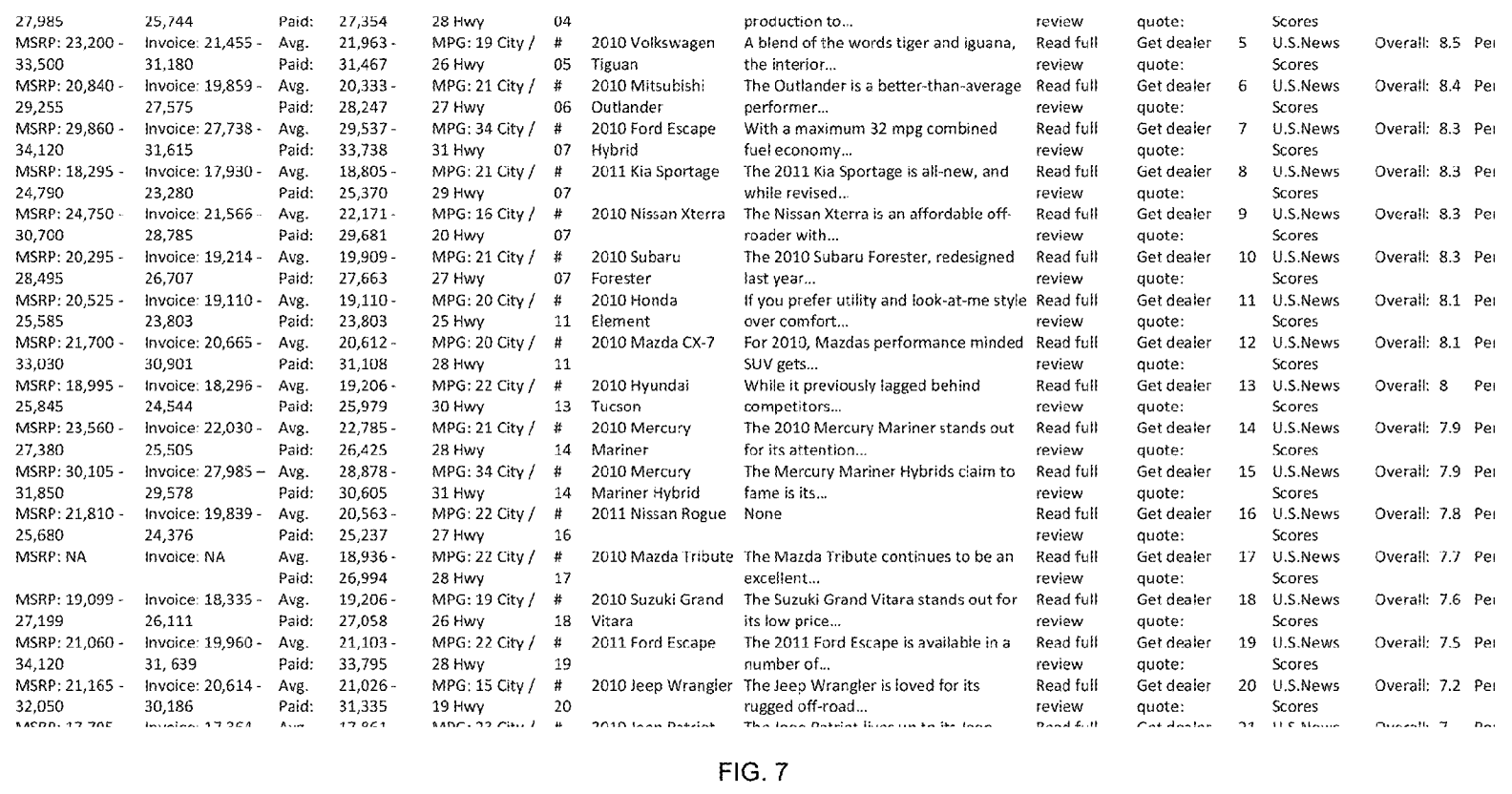

Now referencing FIG. 4, FIG. 5(*a*)-5(*b*), FIG. 6(*a*)-6(*c*) and FIG. 7, these represent specific examples of the data formats described in FIG. 3 as they flow from a specific URL in the set of URLs provided by a Web search engine using the comparison topic "compact SUVs". FIG. 4 is a typical HTML page or document as referenced in FIG. 3, Block 301. FIG. 5(*a*)-5(*b*) is the section of the HTML document that is defined by FIG. 4, Block 401. FIG. 6(*a*)-6(*c*) is the HTML Tag Tree for the HTML document generally referenced in FIG. 3, Block 302 and specifically for the page depicted in FIG. 4 with the section of the HTML tag tree corresponding to FIG. 5(*a*)-5(*b*) expanded to see each node. FIG. 7 is the Page Table as generally referenced in FIG. 3, Block 303 and specifically created from the HTML page depicted in FIG. 4.

TABLE 2

Example of node metadata, referred to as ElementProperties collected in HTML document parsing.

| Name | Type | Description |
|---|---|---|
| tagID | Integer | Unique identifier for each node in the tree structure. The top most node with the with tagID = 1 is referred to as the root node. |
| tagIsCell | Flag | Identifies the node as a cell in a Page Table |
| tagIsTableNode | Flag | Identifies the as the top most node (or root) for the sub tree containing the nodes used in creating the Page Table |
| nodeLevel | Integer | A value to indicate the depth of the node or distance in nodes from the tree structures root node |
| tagType | Interger | Enumerated value for either a specific tag type such as AnchorTag for the HTML tag "a" or general groups of tag such as CloseTag for any type of close tag. Following is an example of tagType, but is not necessarily a complete list of all tagTypes that can or are used in the preferred variation of the present invention:<br>OpenTag = 1;<br>AttribTag = 2;<br>CloseTag = 3;<br>CommentTag = 4;<br>ScriptTag = 5;<br>AnchorTag = 6;<br>LinkTag = 7;<br>BaseTag = 8;<br>MetaTag = 9;<br>InlineTag = 10;<br>DoctypeTag = 11;<br>CrapTag = 12; |
| tagName | String | The industry standard tag or element name for this element with an example being "li" for a List Item. |
| fullTag | String | The complete tag from open to close not including any nested tags |
| tagText | String | Storage for tags that contain a text value with an example being <li> This is text 123< /li> the value "This is text 123" is stored as the value. |
| tagAttributes | List of TagAttributes | If the tag contains attribute(s) they a stored in a list of TagAttributes which is defined as the attribute name and attribute value |
| childNodes | List of ElementProperties | When a tag has nested tags within it these nested tags are attached as a list of childNodes that forms the tag tree structure. A node that has no childNodes is referred to as a leaf node |
| parentNode | ElementProperties | If a tag is nested within another tag, which is true for all but the root tag, the tag nested in is the parent tag with parentNode referencing the parent tag's ElementProperties |

Figure 8:
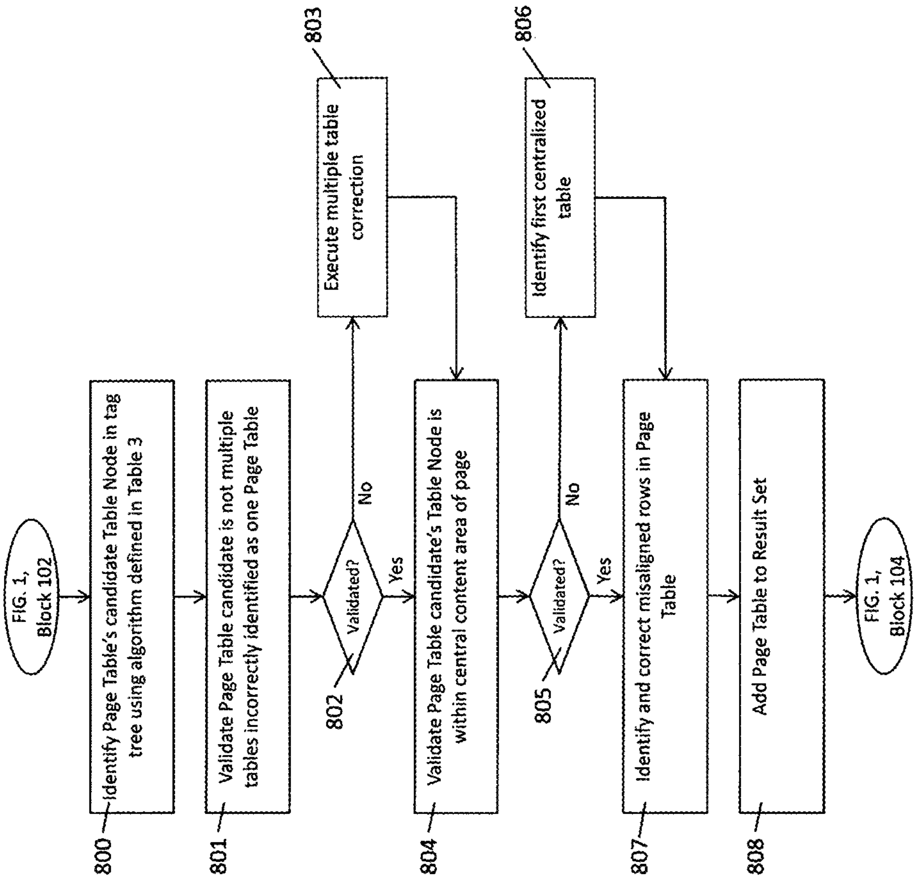
FIG. 8. Is a flow diagram of an exemplary method to automatically extract information from an HTML page into a table and resolve incorrectly merged Table Nodes from a single HTML page.

Block 306 depicts the Attribute Values are contained in the individual cells of the table excluding the Item column and Attribute row. The present computer-implemented system, method or computer program does not define any limitations on the number of Items, Attributes or Attribute Values. Block Now referring to FIG. 8, is a flow diagram for and exemplary extraction of information from the HTML Tag Tree into the Page Table. Block 800 represents the Extraction Algorithm and is described in TABLE 3 and TABLE 4 with further description for FIG. 10. Blocks 801, 802 and 803 are further described for FIG. 12. Block 804 is the identification of the situation where the HTML tag tree contains multiple tables and the incorrect table is identified as the Page Table. This is corrected by selecting a table that is more centrally located on the page. Block 807 is further described for FIG. 11. Block 808 is the adding of each Page Table to the Result Set, which is the set of all Page Tables for each HTML retrieved from the Web. The result is used to create the Result table and is further described in FIG. 3 Blocks 303 and 307 as well as FIG. 13.

TABLE 3

| Mark table cell tags in HTML tag tree algorithm | |
|---|---|
| 1. | ElementProperties defined as metadata for each HTML element (reference TABLE 2) |
| 2. | HTMLTagTree defined as a tree data structure of ElementProperties |
| 3. | NodeLevelProperties defined as int nodeLevel; int tagID |
| 4. | select into nodeLevelList the NodelLevelProperties for all nodes from HTMLTagTree that contain text |
| 5. | minNodes⊠ lowest number of nodes containing text to be considered a table |
| 6. | maxNodes⊠ largest number of items in nodeList |
| 7. | while nodeList.Count > maxNodes |
| 8. | Select into nodeList the nodeLevelProperties from nodeLevelList where grouped by nodeLevel count > minNode |
| 9. | minNode⊠ minNode + x |
| 10. | select into tableNodeList the NodeLevelProperties from nodeList where nodeLevel = max count of nodeLevel |
| 11. | parentNodes defined as a list of tagID |
| 12. | parentList defined as a list of parentNodes |
| 13. | for each NodeLevelProperties.tagID in tableNodeList |
| 14. | add to parentNodes the tagID of each ancestor node of NodeLevelProperties.tagID in HTMLTagTree |
| 15. | add parentNodes to parentList |
| 16. | startNodes defined as list of tagID |
| 17. | for each parentNodes pNodeOS in parentList |
| 18. | for each parentNodes pNodelS in parentList |
| 19. | add to startNodes the max tagID where pNodeOS.tagID = pNodelS.tagID |
| 20. | select tableNodeID from startNodes where max count startNodes.tagID |
| 21. | for each ElementProperties in HTMLTagTree where there is text AND is decendent of tableNodeID element mark as table cell |

TABLE 4

| Build Page Table from marked table cell tags in HTML tag tree algorithm | |
|---|---|
| 1. | ElementProperties defined as metadata for each HTML element (reference TABLE 2) |
| 2. | HTMLTagTree defined as a tree data structure of ElementProperties |
| 3. | tableNodeID defined as int tagID |
| 4. | tableCells defined as a list of String |
| 5. | tableRows defined as a list of tableCells |
| 6. | locate ElementProperties for tableNodeID in HTMLTagTree |
| 7. | create new tableRows |
| 8. | for each child node of tableNodeID |
| 9. | create new tableCells |
| 10. | iterate for each child node until leaf node is reached |
| 11. | if node is table cell then add node text as String to tableCells |
| 12. | add tableCells to tableRows |
| 13. | Page Table⊠ tableCells |

Figure 9:
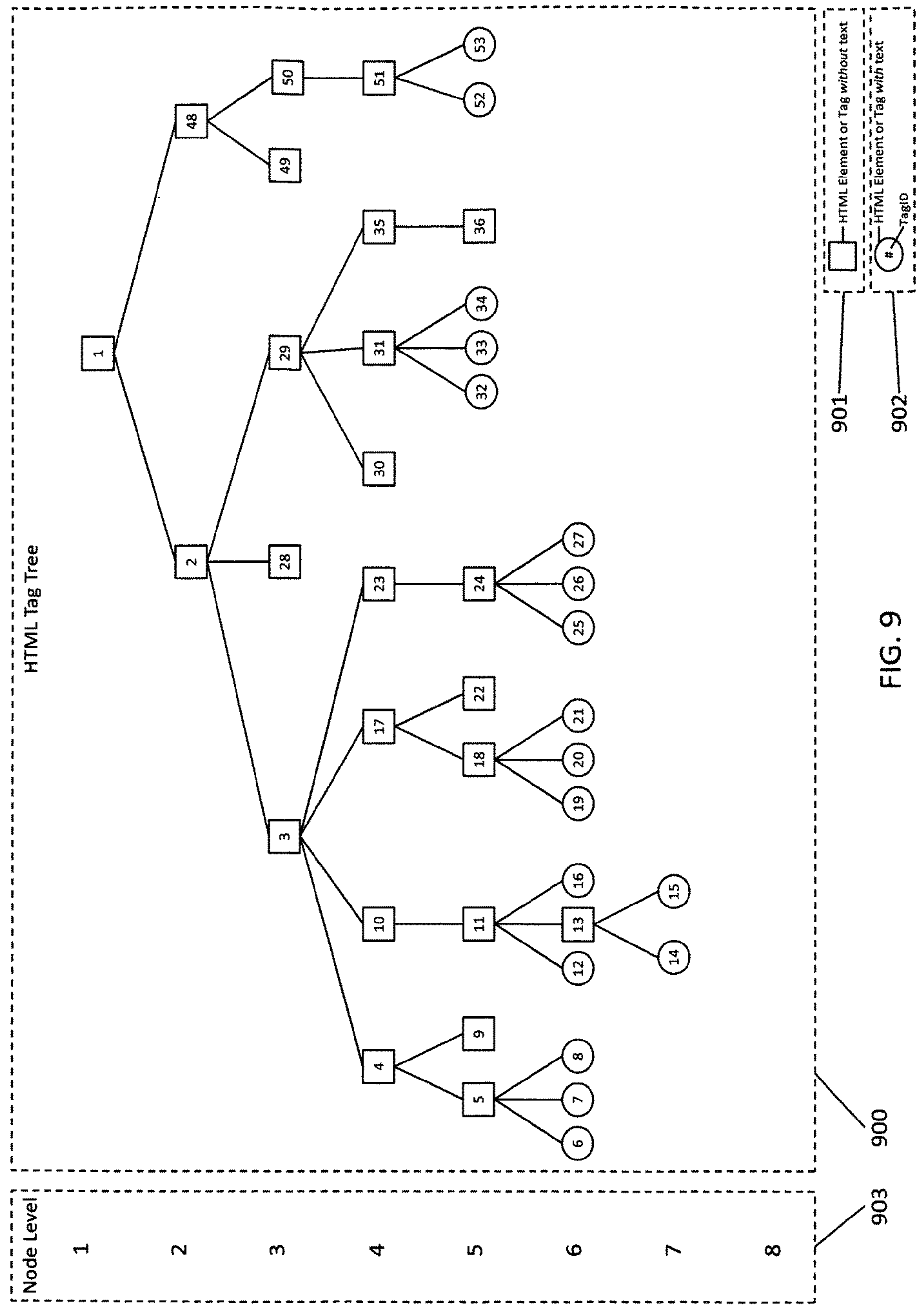
FIG. 9. Is an exemplary illustration of an HTML tag tree with Node Levels and TagIDs.

Now referencing FIG. 9, this is used to visually describe a conceptual HTML Tag Tree and associated metadata that is used to produce a Page Table. Block 900 depicts a conceptual HTML Tag Tree structure containing 53 nodes. HTML documents or pages retrieved from the Web will have broad range of nodes from less than 100 and potentially exceeding 10,000. The most typical are HTML pages with 1,750 to 2,000 nodes. Each node is described by a set of metadata, referred to as the ElementProperties with TABLE 2 providing an example of one of many possible variations of ElementProperties. The tree structure is created programmatically during the parsing of an HTML page or document by linking nested HTML statements using the parentNode and childNodes pointers in the ElementProperties.

Block 901 identifies depicted by squares in Block 900 are nodes that have null or blank values for the tagText in the node metadata. Block 902 indentifies that depicted by circles are the nodes that have a value or contain text in the tagText of the ElementProperties. For HTML pages retrieved from the Web the percentage of nodes that contain text will vary considerably, although 20% may be considered typical. The value inside the circle is the tagID which is a unique identifier for each node in the HTML tree structure. Block 903 identifies the metadata value of nodeLevel, which is defined as the length of the path in nodes from the root node (node with tagID of 1). This is may be referred to as the depth of the node in the tree.

Figure 10:
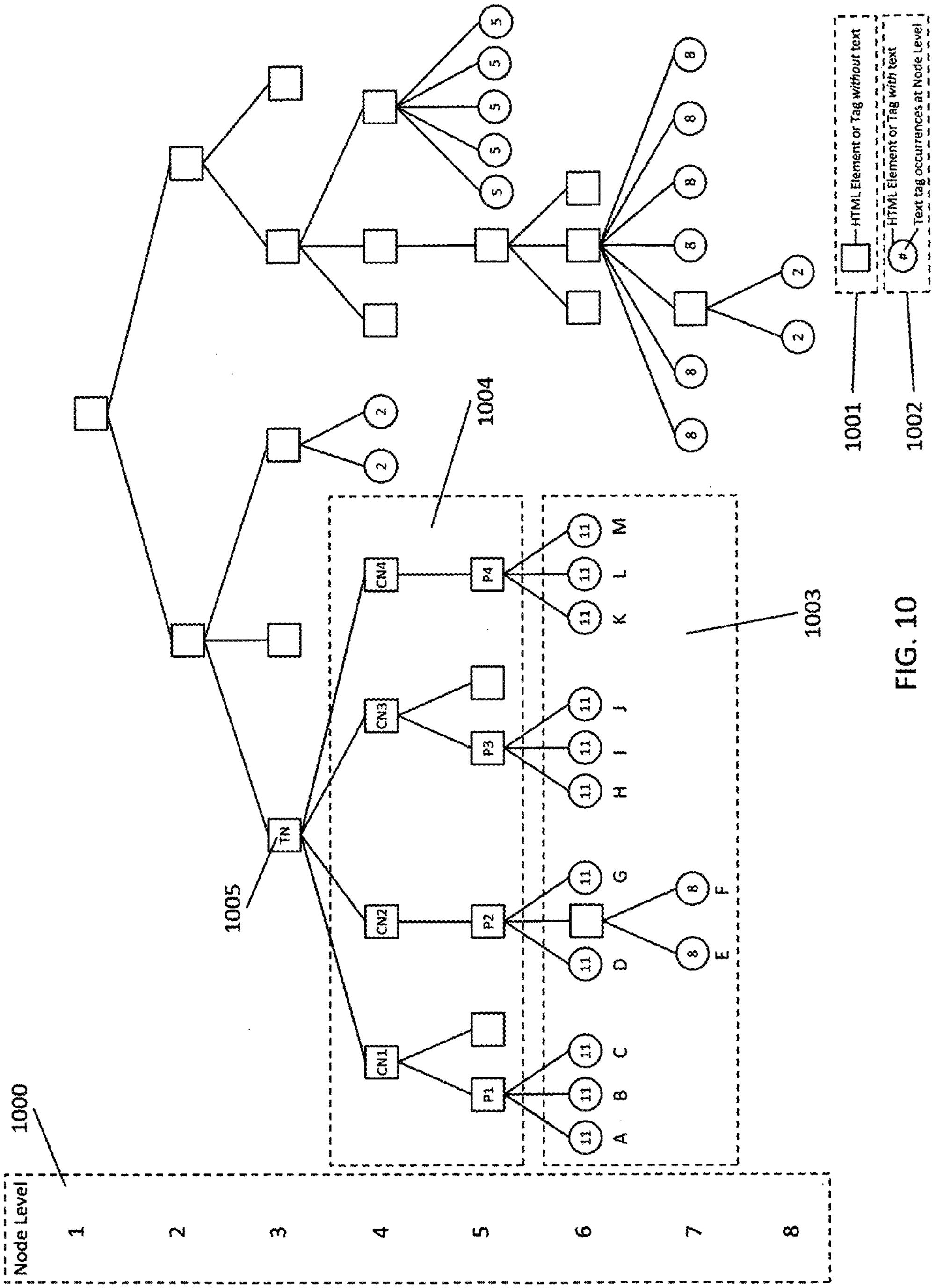
FIG. 10. Is an exemplary illustration of an HTML tag tree depicting Table Nodes and Cell Nodes as well as table row alignment.

Now referencing FIG. 10, this is used to visually describe the algorithms found in TABLE 3 and TABLE 4, together referred to as the Extraction Algorithm that is used to extract information from an HTML Tag Tree into a Page Table. Central to the preferred variation of the present computer-implemented system, method or computer program are the following tenets: 1. For a node to be information for a Page Table cell it is most likely to contain text, or in the contrary a table with no values for all cells provides no information; 2. The nodes containing the Page Table cells generally occur at the same Node Level in the HTML tag tree. Block 1000 identifies the nodeLevel value for each node in the corresponding row of the depicted tag tree. Block 1001 identifies that nodes depicted by squares do not contain text. Block 1002 identifies that nodes depicted by circles contain text with the value in the circle being the number of nodes at that Node Level that contain text. TABLE 3 is the part of the Extraction Algorithm to identify the Page Table cells in the HTML Tree. In Line 4 of the Extraction Algorithm, all “circle” nodes are added to the nodeLevelList. In Line 5 setting minNodes, the minimum number of nodes on a level to be considered a table to a value of “4” would exclude the nodes at Node Levels 4 and 8, which both have two nodes at the respective Node Levels. In Line 8 the nodes from Node Level 5, 6 and 7 are selected into nodeList having greater than four nodes at the Node Level. In Line 10, the eleven nodes from Node Level 6 are selected into tableNodeList having the greatest count compared to five at Node Level 5 and eight at Node Level 7. In Lines 11 through 15 the nodes labeled as P1, P2, P3 and P4 in Block 1004 are parentNodes added to the parentList being the parentNodes of the nodes in the tableNodeList. An example is that P1 in Block 1004 is the parent of the three nodes labeled A, B and C in Block 1003. Lines 16 through 20 identify the ancestor of all nodes in the parentList with the highest nodeLevel as the tableNodeID. In one variation of the computer-implemented system, method or computer program, being only one of many variations, the method used for each node in the parentList identify the startNodes, which are the deepest nodes with a common ancestor for every other node in the parentList, which occurs in lines 17 through 19. Example being the startNode for node labeled P3 for each P1, P2 and P4 is the node labeled TN. In Line 20 the node labeled TN is selected as the tableNodeID being the startNode in a total of twelve instances. In Line 21 the Page Table cells are identified as any node that is a descendent of the tableNodeID node and contains text. These are identified as the nodes labeled A through M, this includes E and F even though having a nodeLevel of 7 and not in the original nodeLevelList with A through D and G through M.

TABLE 4 is the part of the Extraction Algorithm to construct the Page Table after the table cells have been identified. In Line 27, the node labeled TN in FIG. 10 contains the tableNodeID and is identified and referred to as the Table Node. To create a table requires constructing rows of cells where each row has a first cell and a last cell with a row boundary between the last cell of one row and the first cell of the next row. In the Extraction Algorithm each child node of the Table Node is defined as the boundary between one row and the next. In Line 28 a new structure tableRows is created to store the cells for each row. In Line 29 the child nodes of the Table Node, which in Block 1004 are labeled CN1, CN2, CN3 and CN4, are established as the boundary by iterating and creating a row for each child node in Line 30.

In Line 40 and 41 the sub-tree defined by the Table Node is walked, or the nodes are iterated, adding to tableCells a new String for each node that contains a value in the tagText of the nodes ElementProperties. An example being for node CN1, nodes A, B and C are added to tableCells creating a row with a boundary between nodes C and D. Again noting that nodes labeled E and F are included in the tableCells for CN2. The Page Table that will result from FIG. 10 is depicted in FIG. 11 Item 1100.

Figure 11:
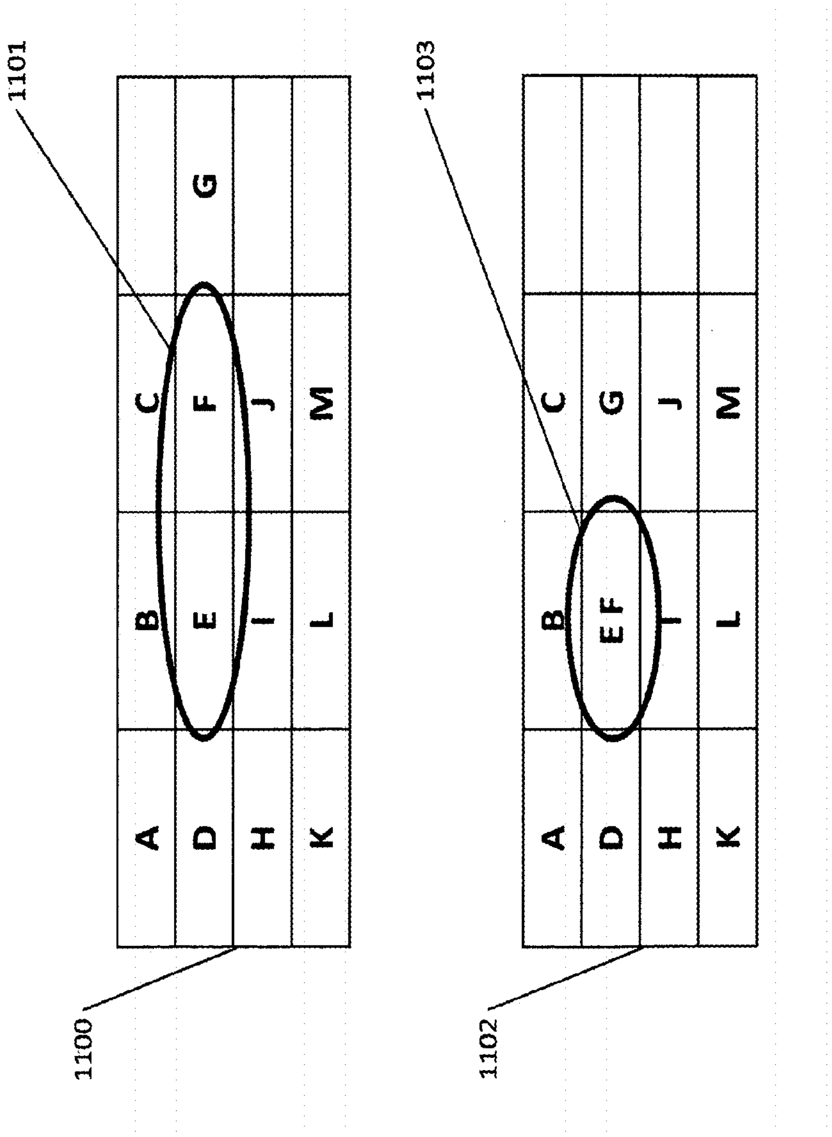
FIG. 11. Is an exemplary illustration of table with incorrectly aligned rows (references FIG. 10).

Now referencing FIG. 11, this is used to visually describe the method to adjust misaligned rows that can occur in extracting information from an HTML Tag Tree into a Page Table as referenced in FIG. 8, Block 807. Misaligned rows are identified by one or more rows of cells being inconsistent with the majority of the cells. Item 1100 is the Page Table that results from the HTML tag tree depicted in FIG. 12. Row 2 in item 1100 extends one cell beyond the other three rows. This is due to an inconsistent nested table, which is depicted in FIG. 10, Block 1003 with the nodes labeled E and F. When extracted the nodes E and F are each stored in individual cells as is shown in FIG. 11 Group 1101. Identifying nodes that do not have a consistent nodeLevel identifies those cells that need to be realigned. To realign the information from the inconsistent nodes are merged together as is depicted in FIG. 11, Item 1102 and Group 1103. Alternatively, all other rows in the Page Table can have an additional cell added to each row in the appropriate location.

Figure 12:
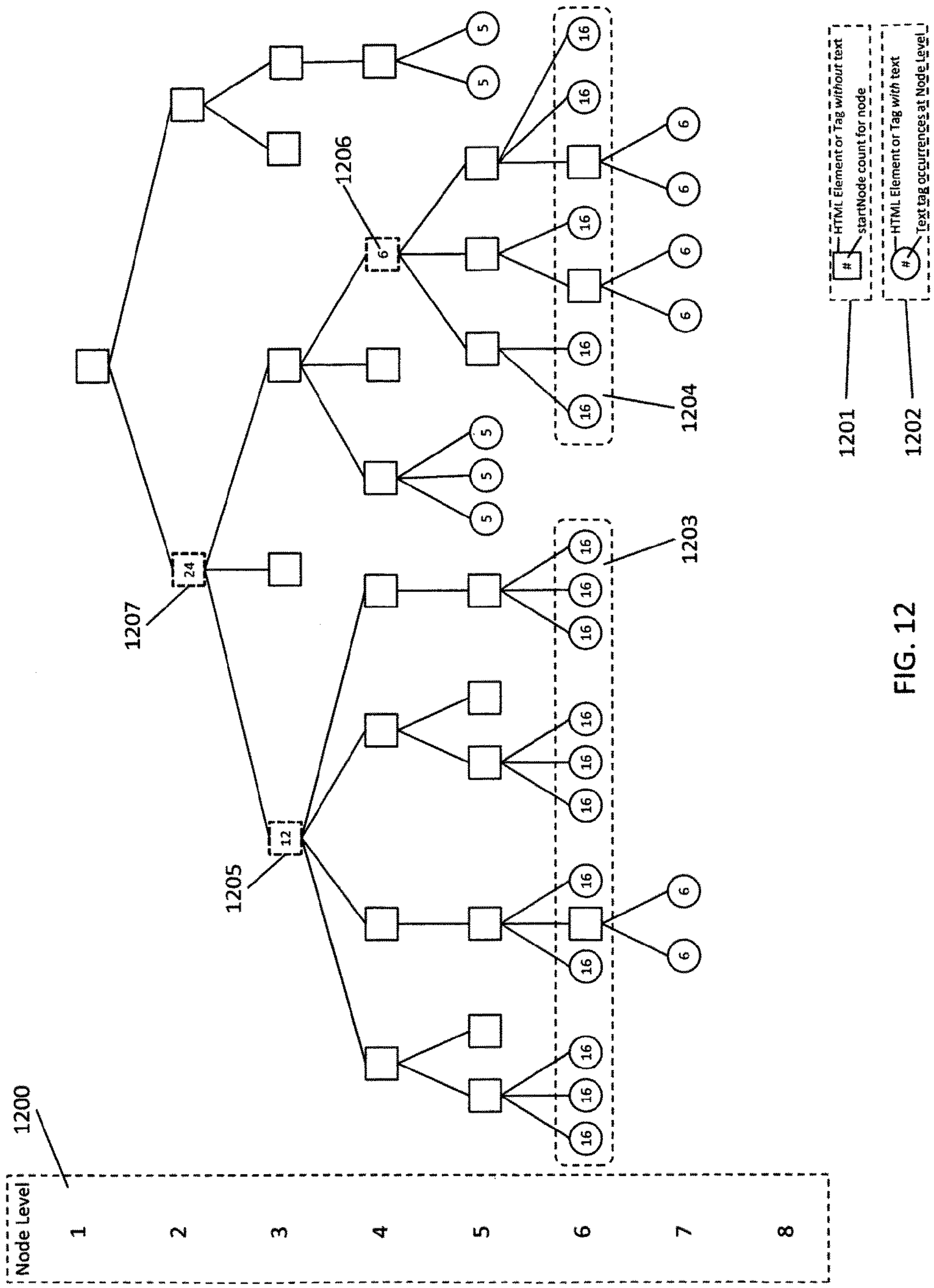
FIG. 12. Is an exemplary illustration of an HTML tag tree depicting incorrectly merged Table Nodes.

Now referencing FIG. 12, this is used to visually describe the method to correct for the infrequent occurrence of nodes containing the information for multiple tables within single HTML Tag Tree erroneously being extracted into a single Page Table. The combining of tables occurs when two tables in the same HTML tag tree are at the same Node Level. This is depicted in FIG. 12 with Node Groups 1203 and 1204. More specifically in the Extraction Algorithm, Lines 17 through 19 the startNodes are identified for the parentNodes of the multiple tables creates a startNode closer to the root node. The result is in Line 20 the max count for startNodes be the node is lowest common ancestor of the two tables. As referenced in FIG. 8, Block 803 this can be corrected once the Table Node is identified by evaluating if there are multiple potential Table Nodes at different Node Levels or if the Table Node has less than three child nodes and and one is proportionally larger. FIG. 12 depicts this with Node 1207 incorrectly identified as the Table Nodes, having three child nodes with Node 1205 having a proportional large startNode count and Node 1206 at a different nodeLevel with proportional large startNode count. Identifying Node 1205 has the Start Node corrects the problem. In the case where incorrectly merged tables are not identified through this process, the result is typically poorly formed tables that would be excluded in the creation of the result table.

The computer implemented system, method, and computer program of this disclosure may operate without parsing an HTML document to locate <tr> (table row) and <td> (table cell) within a <table> structure. Further, the disclosed computer implemented system, method, and computer program may not rely upon using <tr>, <td>, tags within a <table> structure to identify data items in the HTML document. The disclosed computer-implemented method may, by not relying upon these tags, overcome significant limitations supporting commonly occurring circumstances in Web based HTML documents: nested tables, malformed HTML and data not residing in a <table> structure.

Further, the disclosed computer-implemented method, system, and computer program may further operate without using parsed HTML to locate a table structure in the HTML document. It further may operate without attempting to identify the most relevant information through statistical analysis of the text contained in any identified tables.

The disclosed system, method, or computer program may operate without identifying data through a repeating tag sequence, such as <li>text<li>text<li>text. This may alleviate the possible limitation of identifying data only in a <table> structure; and also limitations created by nested tables and malformed HTML.

The disclosed computer implemented method, system, and device may further improve upon manual methods of defining a template which may have use in extracting information from a single HTML page, by providing an automated and thus more efficient comparison process as compared to manually training each page when information is extracted from hundreds of HTML documents.

U.S. Pat. No. 7,590,647 describes a method to extract tabular data from an unstructured HTML document that utilizes a "training sample" that utilize to assist the user in developing the metadata template. This method is effective for a common form of information, such as the SEC filings presented in the Example Applications. In this case, the system is identifying a known type of information over number of different HTML pages for which it can be trained. In the comparison process, the method described in U.S. Pat. No. 7,590,647 is eliminated for use in Block 200, referencing FIG. 2 because the data is not known and therefore the system cannot be trained. U.S. Pat No. 6,920,609 describes another method of extracting data from HTML pages that requires minimal. This method may train for spatial metadata (where the data is located on the page) rather than textual metadata as in U.S. Pat. No. 7,590,647. This method is an effective for similar structured HTML documents that having potentially unrelated data such Yahoo! Shopping. The need for training with the U.S. Pat. No. 7,590,647 method also renders it ineffective for use in the comparison process.

RPA US 20080294679 describes a method using spatial reasoning on the CSS2 visual box model to identify table structures in the HTML document. The location of the information on the page as determined by the Cascading Style Sheet (CSS) with visual attributes (eight for nodes, nine for words) are used to determine the information to extract. The 20080294679 method benefits from being fully automated, however is not a practical candidate for the comparison process. The rendering of hundreds of pages as required in the comparison process is a performance inhibitor, particularly as the use of relative positioning is becoming more common on Web sites. Furthermore, the ability to identify each record will be very problematic in the common master detail structure, particularly where each detail (record) consists of multiple nested tables and panels.

In (Chang and Lui, 2001) the system IEPAD is described utilizing a pattern matching algorithm that translates the HTML tokens into binary encoded streams. Using a PAT tree, patterns are identified with those of the highest instance of repeats are considered as table candidates. The approach benefits from requiring no training and efficiency. However, it falls short as an effective method for the comparison process as it relies on specific tag types as well as consistently formed tables which are impacted by commonly malformed HTML documents.

In (Crescenzi, Mecca and Merialdo, 2001) foundational study in automated data extraction, a program named Roadrunner is described that utilizes another pattern matching technique called ACME (Align, Collapse, Mismatch and Extract) that attempts to address problems with malformed HTML through the use of converting HTML to the more structured XHTML. However, the automated wrapper generation as described uses an approach of matching the tag tree structure over set of similar HTML pages, which is not a feasible approach for use in the comparison process. This is because each page is the comparison result set are most likely to be from distinctly different site with so expected similarities from page to page in the result set.

In (Jindal, 2005) with further refinement in (Jindal and Liu, 2010) multiple approaches are combined in the described G-STM algorithm for automated data extraction. The G-STM builds upon IEPAD (Chang and Lui, 2001) and Roadrunner (Crescenzi, Mecca and Merialdo, 2001) and results in pattern matching approach that can work on a single page. This approach shows success in managing nested tables (lists) and identifying record boundaries in a modest size research test set. However, this approach utilizes tag names for scoring sub trees and matching root nodes as well as anticipating consistent node alignment, which are all problems in the comparison process that requires large sets of unique pages that are often contain large numbers of malformed pages. Additionally, the G-STM algorithm matches and scores the trees on a page iteratively, which is may result in a performance problem in the comparison process.

In summary, the computer implemented system, method and computer program described and claimed herein improves over the many documented methods to extract information from an HTML page into a data table. Wrapper induction algorithms that require training are impractical for the large set of unique pages in the comparison process result sets. Known pattern matching and spatial based automated data extraction algorithms, there is a high error rate identifying and extracting multiply nested, master detail structures. With the patterns with in patterns, it become difficult to determine the record edge as well as table cell (or column) edges. The G-STM (Jindal and Liu, 2010) presents a plausible approach for automated data extraction, but one the still presents multiple and challenging problems.

While various variations of the computer-implemented system, method or computer program have been described, it will be apparent to those of ordinary skill in the art that many more variations and implementations are possible that are within the scope of the computer-implemented system, method or computer program.

The invention claimed is:

1. A computer-implemented method comprising the steps of:

obtaining a result set of a plurality of search results from a search engine in response to a query for an item from a user, wherein each of the plurality of search results comprises a uniform resource locator (URL);

downloading, for each URL of the result set, a corresponding Hypertext Markup Language (HTML) document;

building, for each HTML document, a hierarchical tree of elements defined by a Document Object Model (DOM) associated with the HTML document, wherein the hierarchical tree of elements comprises nodes which represent elements in the HTML document;

parsing each HTML document to identify data and metadata, wherein the metadata comprises: element name, element type, element text, node ID number, and node level, and wherein the node level indicates a depth of an element in the hierarchical tree of elements;

determining, for each HTML document, whether the data should be extracted into a corresponding page table, wherein the page table comprises: rows of items, columns of attributes, and cells of attribute values, and wherein the determining is based in part on whether the data positively satisfies all of: a plurality of elements exist at the same node level, each element contains element text, and each element occurs in the middle of the HTML document;

in response to determining that the data should be extracted into the corresponding page table:

extracting text from nodes at a first node level, wherein the first node level contains at least a threshold quantity of nodes containing element text, and for each child node of a node from the extracting step, recursively extracting text from all successive child nodes;

consolidating the page tables into a result table;

providing to the user a user interface comprising the page tables and the result table, wherein the user interface permits the editing of the page tables and result table.

* * * * *